US010834782B2

(12) United States Patent
Malik et al.

(10) Patent No.: US 10,834,782 B2
(45) Date of Patent: Nov. 10, 2020

(54) TECHNIQUES FOR LOW-BAND ANCHORED HIGH-BAND CONNECTIONS IN WIRELESS COMMUNICATIONS

(71) Applicant: QUALCOMM Incorporated, San Diego, CA (US)

(72) Inventors: Rahul Malik, San Diego, CA (US); Srinivas Yerramalli, San Diego, CA (US); Kaushik Chakraborty, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/180,938

(22) Filed: Nov. 5, 2018

(65) Prior Publication Data
US 2019/0141783 A1 May 9, 2019

Related U.S. Application Data

(60) Provisional application No. 62/582,822, filed on Nov. 7, 2017.

(51) Int. Cl.
*H04W 88/06* (2009.01)
*H04W 74/08* (2009.01)
(Continued)

(52) U.S. Cl.
CPC ............ *H04W 88/06* (2013.01); *H04L 5/006* (2013.01); *H04L 5/0044* (2013.01);
(Continued)

(58) Field of Classification Search
CPC combination set(s) only.
See application file for complete search history.

(56) References Cited

U.S. PATENT DOCUMENTS

2014/0044041 A1 2/2014 Moshfeghi et al.
2014/0321282 A1* 10/2014 Pragada ............ H04W 36/0072
370/235
(Continued)

FOREIGN PATENT DOCUMENTS

EP 2624613 A1 8/2013

OTHER PUBLICATIONS

International Search Report and Written Opinion—PCT/US2018/059414—ISA/EPO—dated Mar. 1, 2019.

*Primary Examiner* — Michael J Moore, Jr.
(74) *Attorney, Agent, or Firm* — Linda G. Gunderson; Holland & Hart LLP

(57) ABSTRACT

Methods, systems, and devices for wireless communications are described that provide for activating and deactivating high-band connections, such as millimeter wave (mmW) connections while maintaining a low-band connection, based on a state of a user equipment (UE). An initial low-band connection, such as a connection that uses lower frequencies than mmW frequencies, may be established by a UE and a base station, and the base station may configure the UE for one or more high-band connections with one or more high-band base stations. The base station may provide an activation command to the UE to activate a high-band connection, and the UE may determine a currently supported mode for the activated high-band connection and establish the high-band connection based on the currently supported mode.

30 Claims, 21 Drawing Sheets

(51) Int. Cl.
*H04L 27/26* (2006.01)
*H04W 76/27* (2018.01)
*H04W 8/24* (2009.01)
*H04L 5/00* (2006.01)
*H04W 76/15* (2018.01)
*H04W 88/08* (2009.01)
*H04W 36/06* (2009.01)
*H04W 88/02* (2009.01)

(52) U.S. Cl.
CPC ........ *H04L 27/261* (2013.01); *H04L 27/2666* (2013.01); *H04W 8/24* (2013.01); *H04W 74/0833* (2013.01); *H04W 76/15* (2018.02); *H04W 76/27* (2018.02); *H04L 5/001* (2013.01); *H04L 5/0007* (2013.01); *H04L 5/0048* (2013.01); *H04L 5/0098* (2013.01); *H04W 36/06* (2013.01); *H04W 88/02* (2013.01); *H04W 88/08* (2013.01)

(56) References Cited

U.S. PATENT DOCUMENTS

| | | | |
|---|---|---|---|
| 2015/0004918 A1* | 1/2015 | Wang | H04W 40/12 455/73 |
| 2015/0043538 A1 | 2/2015 | Xu et al. | |
| 2015/0045048 A1* | 2/2015 | Xu | H04W 4/023 455/452.1 |
| 2015/0351135 A1* | 12/2015 | Schmidt | H04W 76/10 455/450 |
| 2016/0183242 A1* | 6/2016 | Cordeiro | H04W 36/22 370/331 |
| 2016/0353510 A1* | 12/2016 | Zhang | H04L 43/16 |
| 2017/0332300 A1* | 11/2017 | Choi | H04W 36/00 |
| 2017/0347277 A1* | 11/2017 | Zhang | H04W 16/32 |
| 2017/0374703 A1* | 12/2017 | Sang | H04W 76/15 |
| 2018/0007563 A1* | 1/2018 | Zhang | H04W 76/27 |
| 2018/0249461 A1* | 8/2018 | Miao | H04W 72/046 |
| 2019/0069228 A1* | 2/2019 | Malik | H04L 5/005 |
| 2019/0069336 A1* | 2/2019 | Malik | H01Q 5/307 |
| 2019/0082317 A1* | 3/2019 | Gaal | H04W 8/24 |
| 2019/0082395 A1* | 3/2019 | Malladi | H04W 52/245 |
| 2019/0110254 A1* | 4/2019 | Yerramalli | H04L 5/0051 |

* cited by examiner

TECHNIQUES FOR LOW-BAND ANCHORED HIGH-BAND CONNECTIONS IN WIRELESS COMMUNICATIONS

CROSS REFERENCES

The present Application for Patent claims the benefit of U.S. Provisional Patent Application No. 62/582,822 by MALIK et al., entitled "TECHNIQUES FOR LOW-BAND ANCHORED HIGH-BAND CONNECTIONS IN WIRELESS COMMUNICATIONS," filed Nov. 7, 2017, assigned to the assignee hereof, and expressly incorporated herein.

BACKGROUND

The following relates generally to wireless communication, and more specifically to techniques for low-band anchored high-band connections in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some systems, millimeter wave (mmW) frequencies may be used for some communications between a base station and a UE, alone or in conjunction with one or more other lower (e.g., non-mmW) frequencies. In a mmW system, a base station and a UE may communicate via one or more directional beams. A transmitter (e.g., a base station) may engage in a beam sweeping procedure to establish an active beam pair with a receiver (e.g., a UE). An active beam pair may include an active transmit beam of the transmitter and a corresponding active receive beam of the receiver. Establishing and communicating using an active beam pair may consume a relatively large amount of power, and in some cases mmW transmissions from a UE may be subject to maximum permissible exposure (MPE) limits, which limit an amount of mmW radiation that a UE may emit during a particular time period. Thus, efficient establishment, activation, and deactivation of mmW connections at a UE may be desirable in order to enhance UE operation.

SUMMARY

The described techniques relate to improved methods, systems, devices, or apparatuses that support techniques for low-band anchored high-band connections in wireless communications. Generally, the described techniques provide for activating and deactivating high-band connections, such as millimeter wave (mmW) connections, based on a state of a user equipment (UE). In some cases, an initial low-band connection (e.g., a connection that uses lower frequencies than mmW frequencies, or sub-6 GHz frequencies) may be established by a UE and a base station, and the base station may configure the UE for one or more high-band connections with one or more high-band base stations. The base station may provide an activation command to the UE to activate a high-band connection, and the UE may determine a currently supported mode for the activated high-band connection and establish the high-band connection based on the currently supported mode.

In some cases, following the establishment of the low-band connection, the UE may be in a connected low-band state, and may then move to a connected low-band with mmW activated state upon receipt of the activation command. In some cases, the UE may have a number of sub-states based on the currently supported mode for the activated high-band connection, such as a high-band not found state, a high-band downlink only state (e.g., when a power budget, battery level, or exposure limits at the UE may not allow high-band transmissions), a high-band downlink only plus uplink control state (e.g., when a power budget, battery level, or exposure limits at the UE may allow only limited high-band transmissions), or a high-band uplink and downlink state (e.g., when a power budget, battery level, or exposure limits at the UE allow unconstrained high-band transmissions).

A method of wireless communication is described. The method may include establishing a low-band connection with a base station, receiving, from the base station via the low-band connection, configuration information for one or more high-band connections (e.g., one or more high-band connections using mmW frequencies, where the low-band connection uses lower frequencies than the mmW frequencies), receiving an activation command from the base station to activate one of the one or more high-band connections, determining a currently supported mode for an activated high-band connection, and transmitting an indication to the base station of the currently supported mode for the activated high-band connection.

An apparatus for wireless communication is described. The apparatus may include means for establishing a low-band connection with a base station, means for receiving, from the base station via the low-band connection, configuration information for one or more high-band connections (e.g., one or more high-band connections using mmW frequencies, wherein the low-band connection uses lower frequencies than the mmW frequencies), means for receiving an activation command from the base station to activate one of the one or more high-band connections, means for determining a currently supported mode for an activated high-band connection, and means for transmitting an indication to the base station of the currently supported mode for the activated high-band connection.

Another apparatus for wireless communication is described. The apparatus may include a processor, memory in electronic communication with the processor, and instructions stored in the memory. The instructions may be operable to cause the processor to establish a low-band connection with a base station, receive, from the base station via the low-band connection, configuration information for one or more high-band connections, receive an activation command from the base station to activate one of the one or more high-band connections, determine a currently supported mode for an activated high-band connection, and transmit an indication to the base station of the currently supported mode for the activated high-band connection.

A non-transitory computer-readable medium for wireless communication is described. The non-transitory computer-readable medium may include instructions operable to cause a processor to establish a low-band connection with a base station, receive, from the base station via the low-band connection, configuration information for one or more high-band connections, receive an activation command from the base station to activate one of the one or more high-band connections, determine a currently supported mode for an activated high-band connection, and transmit an indication to the base station of the currently supported mode for the activated high-band connection.

Some examples of the method, apparatus, and non-transitory computer-readable medium described above may further include processes, features, means, or instructions for measuring, responsive to receiving the activation command, one or more reference signals associated with the one or more high-band connections, and wherein the determining may be based at least in part on the measured one or more reference signals. In some examples of the method, apparatus, and non-transitory computer-readable medium described above, the one or more reference signals comprise one or more of a user equipment (UE) specific reference signal, a discovery reference signal (DRS), a channel state information reference signal (CSI-RS), or any combination thereof. In some examples of the method, apparatus, and non-transitory computer-readable medium described above, the one or more reference signals may be transmitted responsive to the activation command, may be broadcast reference signals, or any combination thereof.

In some examples of the method, apparatus, and non-transitory computer-readable medium described above, the transmitting the indication may include identifying uplink resources of the low-band connection or the activated high-band connection for transmitting the indication, the uplink resources comprising one or more of random access resources, contention free random access resources, partitioned random access resources with partitions based on an identification of the currently supported mode, uplink control channel resources, autonomous uplink resources, or any combination thereof. Some examples of the method, apparatus, and non-transitory computer-readable medium described above may further include processes, features, means, or instructions for transmitting the indication using the identified uplink resources.

Some examples of the method, apparatus, and non-transitory computer-readable medium described above may further include processes, features, means, or instructions for periodically re-evaluating the currently supported mode for the activated high-band connection. Some examples of the method, apparatus, and non-transitory computer-readable medium described above may further include processes, features, means, or instructions for transmitting a second indication to the base station based at least in part on the re-evaluated currently supported mode for the activated high-band connection, and the second indication may be transmitted periodically or upon a change in the currently supported mode for the activated high-band connection.

In some examples of the method, apparatus, and non-transitory computer-readable medium described above, the determining the currently supported mode for the activated high-band connection may include measuring one or more channel parameters for the one or more high-band connections, identifying one or more user equipment (UE) parameters associated with transmissions for the activated high-band connection, and determining the currently supported mode for the activated high-band connection based at least in part on the one or more channel parameters, the one or more UE parameters, or any combination thereof. In some examples of the method, apparatus, and non-transitory computer-readable medium described above, the one or more UE parameters comprise one or more of a power link budget for high-band transmissions, a maximum permissible exposure (MPE) threshold for high-band transmissions, a UE battery state, a UE context and currently running applications, or any combination thereof. In some examples of the method, apparatus, and non-transitory computer-readable medium described above, the one or more channel parameters comprise one or more of a reference signal received power (RSRP) of one or more high-band transmissions, a beam direction of one or more high-band transmissions, a channel quality measurement of one or more high-band transmissions, or any combination thereof.

In some examples of the method, apparatus, and non-transitory computer-readable medium described above, the method may be performed by a user equipment (UE), and wherein the UE transitions to a radio resource control (RRC) high-band activated state or to a high-band activated device state responsive to receiving the activation command. In some examples of the method, apparatus, and non-transitory computer-readable medium described above, the currently supported mode for the activated high-band connection may be selected from a high-band connection not found mode, a high-band downlink only mode, a high-band downlink only with uplink control mode, or a high-band downlink and uplink mode.

Some examples of the method, apparatus, and non-transitory computer-readable medium described above may further include processes, features, means, or instructions for determining that the currently supported mode for the activated high-band connection may have changed. Some examples of the method, apparatus, and non-transitory computer-readable medium described above may further include processes, features, means, or instructions for transmitting a second indication to the base station to indicate the change in the currently supported mode for the activated high-band connection.

In some examples of the method, apparatus, and non-transitory computer-readable medium described above, the receiving the activation command from the base station may include receiving an indication that a high-band connection is to be activated, and a high-band transmission from one or more base stations may be monitored for based at least in part on the configuration information for the one or more high-band connections. Some examples of the method, apparatus, and non-transitory computer-readable medium described above may further include processes, features, means, or instructions for identifying a first high-band transmitter for establishing the high-band connection. Some examples of the method, apparatus, and non-transitory computer-readable medium described above may further include processes, features, means, or instructions for transmitting a random access request to the first high-band transmitter. Some examples of the method, apparatus, and non-transitory computer-readable medium described above may further include processes, features, means, or instructions for receiving an acknowledgment that the random access request was successfully received.

Some examples of the method, apparatus, and non-transitory computer-readable medium described above may further include processes, features, means, or instructions for receiving a reconfiguration message to configure the activated high-band connection. Some examples of the method, apparatus, and non-transitory computer-readable medium described above may further include processes, features, means, or instructions for reconfiguring active connections based at least in part on the reconfiguration message. Some examples of the method, apparatus, and non-transitory computer-readable medium described above may further include processes, features, means, or instructions for transmitting a reconfiguration complete message to the first high-band transmitter.

Some examples of the method, apparatus, and non-transitory computer-readable medium described above may further include processes, features, means, or instructions for receiving a deactivation command to deactivate the activated high-band connection. Some examples of the method, apparatus, and non-transitory computer-readable medium described above may further include processes, features, means, or instructions for deactivating the activated high-band connection responsive to the deactivation command.

A method of wireless communication is described. The method may include establishing a low-band connection with a user equipment, transmitting configuration information for one or more high-band connections to the UE via the low-band connection (e.g., one or more high-band connections using mmW frequencies, where the low-band connection uses lower frequencies than the mmW frequencies), transmitting an activation command to the UE to activate one of the one or more high-band connections, and receiving an indication of a currently supported mode of the UE for the one or more high-band connections responsive to transmitting the activation command.

An apparatus for wireless communication is described. The apparatus may include means for establishing a low-band connection with a user equipment, means for transmitting configuration information for one or more high-band connections to the UE via the low-band connection (e.g., one or more high-band connections using mmW frequencies, where the low-band connection uses lower frequencies than the mmW frequencies), means for transmitting an activation command to the UE to activate one of the one or more high-band connections, and means for receiving an indication of a currently supported mode of the UE for the one or more high-band connections responsive to transmitting the activation command.

Another apparatus for wireless communication is described. The apparatus may include a processor, memory in electronic communication with the processor, and instructions stored in the memory. The instructions may be operable to cause the processor to establish a low-band connection with a user equipment, transmit configuration information for one or more high-band connections to the UE via the low-band connection, transmit an activation command to the UE to activate one of the one or more high-band connections, and receive an indication of a currently supported mode of the UE for the one or more high-band connections responsive to transmitting the activation command.

A non-transitory computer-readable medium for wireless communication is described. The non-transitory computer-readable medium may include instructions operable to cause a processor to establish a low-band connection with a user equipment, transmit configuration information for one or more high-band connections to the UE via the low-band connection, transmit an activation command to the UE to activate one of the one or more high-band connections, and receive an indication of a currently supported mode of the UE for the one or more high-band connections responsive to transmitting the activation command.

In some examples of the method, apparatus, and non-transitory computer-readable medium described above, the currently supported mode for the one or more high-band connections may be based at least in part on a power link budget for high-band transmissions, a maximum permissible exposure (MPE) threshold for high-band transmissions, a UE battery state, a UE context and currently running applications, or any combination thereof.

Some examples of the method, apparatus, and non-transitory computer-readable medium described above may further include processes, features, means, or instructions for receiving a second indication from the UE that indicates a change in the currently supported mode for the one or more high-band connections. Some examples of the method, apparatus, and non-transitory computer-readable medium described above may further include processes, features, means, or instructions for transmitting a reconfiguration command to the UE responsive to the second indication. In some examples of the method, apparatus, and non-transitory computer-readable medium described above, the currently supported mode for the one or more high-band connections may be selected from a high-band connection not found mode, a high-band downlink only mode, a high-band downlink only with uplink control mode, or a high-band downlink and uplink mode.

In some examples of the method, apparatus, and non-transitory computer-readable medium described above, the transmitting the activation command may include transmitting an indication that a high-band connection is to be activated. In some examples of the method, apparatus, and non-transitory computer-readable medium described above, the method further comprises receiving an indication that the high-band connection has been activated.

Some examples of the method, apparatus, and non-transitory computer-readable medium described above may further include processes, features, means, or instructions for determining that the high-band connection is to be deactivated. Some examples of the method, apparatus, and non-transitory computer-readable medium described above may further include processes, features, means, or instructions for transmitting a deactivation command to the UE to deactivate the high-band connection. Some examples of the method, apparatus, and non-transitory computer-readable medium described above may further include processes, features, means, or instructions for coordinating with one or more high-band transmitters to transmit one or more reference signals associated with the one or more high-band connections.

In some examples of the method, apparatus, and non-transitory computer-readable medium described above, the one or more reference signals comprise one or more of a user equipment (UE) specific reference signal, a discovery reference signal (DRS), a channel state information reference signal (CSI-RS), or any combination thereof. In some examples of the method, apparatus, and non-transitory computer-readable medium described above, the one or more reference signals may be transmitted responsive to the activation command, may be broadcast reference signals, or any combination thereof. In some examples of the method, apparatus, and non-transitory computer-readable medium described above, the configuration information further comprises uplink resources of the low-band connection or the one or more high-band connections for transmitting the indication, the uplink resources comprising one or more of random access resources, contention free random access resources, partitioned random access resources with partitions based on an identification of the currently supported mode, uplink control channel resources, autonomous uplink resources, or any combination thereof.

DETAILED DESCRIPTION

Figure 1:
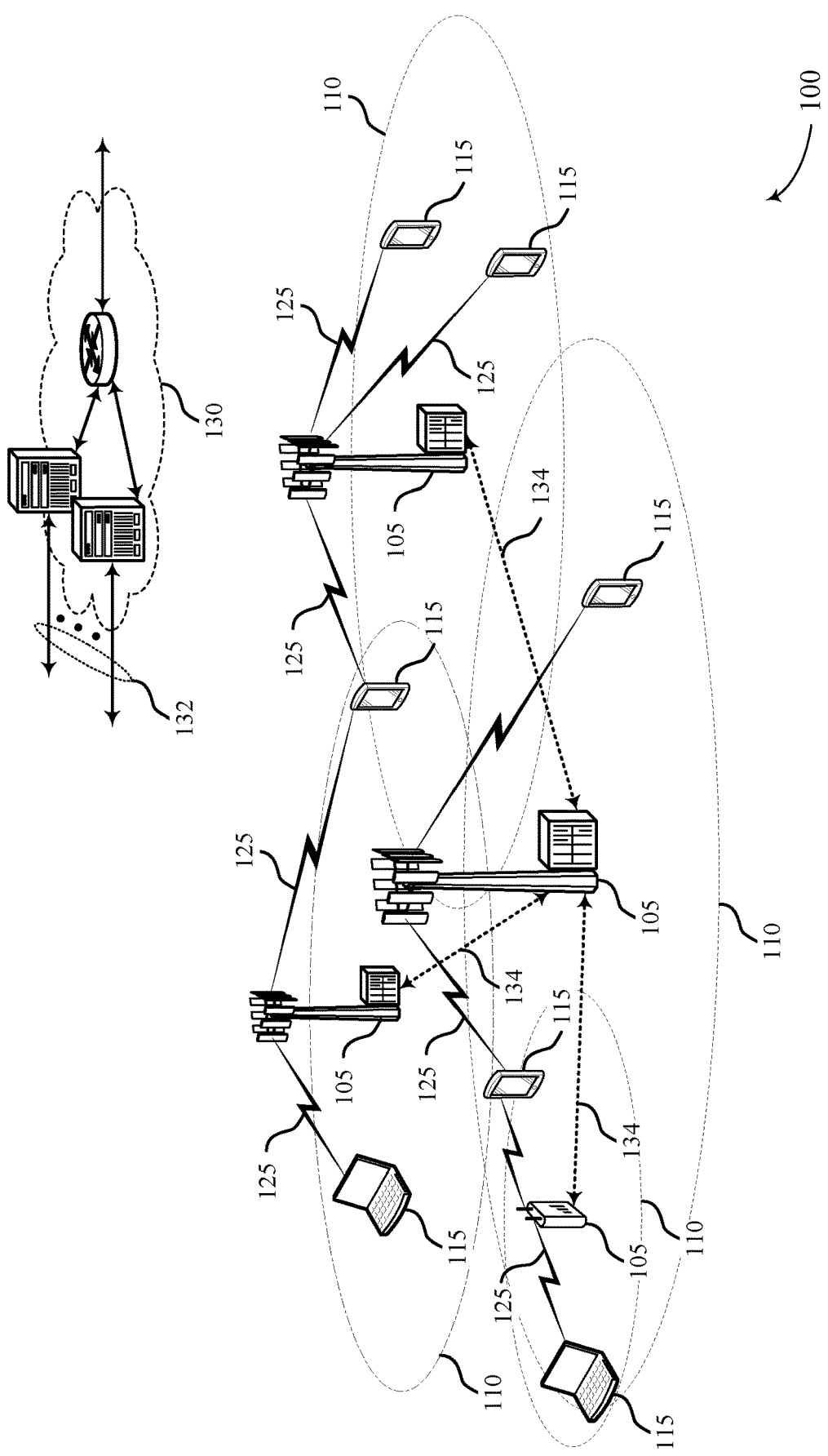
FIG. 1 illustrates an example of a system for wireless communication that supports techniques for low-band anchored high-band connections in wireless communications in accordance with aspects of the present disclosure.

Various described techniques provide for activation and deactivation of high-band connections, such as millimeter wave (mmW) connections, based on a state of a user equipment (UE). In some cases, an initial low-band connection (e.g., a connection that uses lower frequencies than mmW frequencies, or sub-6 GHz frequencies) may be established by a UE and a base station, and the base station may configure the UE for one or more high-band connections with one or more high-band base stations. The base station may provide an activation command to the UE to activate a high-band connection, and the UE may determine a currently supported mode for the activated high-band connection and establish the high-band connection based on the currently supported mode.

As indicated above, in mmW systems a base station and UE may communicate via one or more directional beams, and a base station may engage in a beam sweeping operation to establish an active transmit beam with a UE. A base station may also engage in beam tracking to maintain a connection with a UE. According to various aspects of the present disclosure, a low-band connection may be established between the UE and the base station, and the base station may provide, via the low-band connection, configuration information that may assist the UE in identifying a beam from one or more high-band base stations. For example, the configuration information may include one or more frequencies to monitor for a reference signal (e.g., a discovery reference signal (DRS), channel state information reference signal (CSI-RS), a UE-specific reference signal (UE-RS), or combinations thereof), certain times during which the UE should monitor for the reference signal (e.g., one or more slots), or combinations thereof. Furthermore, in some cases UEs may be configured with uplink resources to use for transmission of an uplink transmission responsive to receiving a high-band signal, such as, for example, random access resources, contention free random access resources, partitioned random access resources with partitions based on an identification of the currently supported mode, uplink control channel resources, autonomous uplink resources, or any combination thereof. The uplink resources may be configured for high-band uplink transmissions, low-band uplink transmissions, or both.

In some cases, following the establishment of the low-band connection, the UE may be in a connected low-band state, and may then move to a connected low-band with high-band (e.g., mmW) activated state upon receipt of the activation command. In some cases, the UE may have a number of sub-states based on the currently supported mode for the activated high-band connection, such as a high-band not found state, a high-band downlink only state (e.g., when a power budget, battery level, or exposure limits at the UE may not allow high-band transmissions), a high-band downlink only plus uplink control state (e.g., when a power budget, battery level, or exposure limits at the UE may allow only limited high-band transmissions), or a high-band uplink and downlink state (e.g., when a power budget, battery level, or exposure limits at the UE allow unconstrained high-band transmissions). In some cases, the UE may signal the currently supported mode for the activated high-band connection when transmitting an uplink transmission responsive to monitoring for the high-band reference signals. In some cases, the UE may re-evaluate its currently supported mode for the activated high-band connection, and update the base station either periodically or when the currently supported mode changes (e.g., due to power limitations, maximum permissible exposure (MPE) thresholds, UE battery state, current context and applications running at the UE, or combinations thereof). Various examples provided herein show that high-band connections are mmW connections and low-band connections use frequencies lower than mmW frequencies, although it is to be understood that the techniques provided herein are not limited to mmW systems and can be used in any system in which different frequency bands may be concurrently activated at a UE.

Aspects of the disclosure are initially described in the context of a wireless communications system. Aspects of the disclosure are then illustrated by examples of wireless communications systems, state diagrams, and process flows. Aspects of the disclosure are further illustrated by and described with reference to apparatus diagrams, system diagrams, and flowcharts that relate to techniques for low-band anchored high-band connections in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

As indicated above, in some cases, one or more of the base station 105 may provide low-band connections to UEs 115, and one or more base stations 105 may provide high-band connections to UEs 115, and high-band connections may be activated and deactivated in an efficient manner. In some cases, an initial low-band connection may be established by a UE 115 and a base station 105, and the base station 105 may pre-configure the UE 115 for one or more high-band connections. The base station 105 may provide an activation command to the UE 115 to activate a high-band connection, and the UE 115 may determine a currently supported mode for the activated high-band connection and establish the high-band connection based on the currently supported mode.

Figure 2:
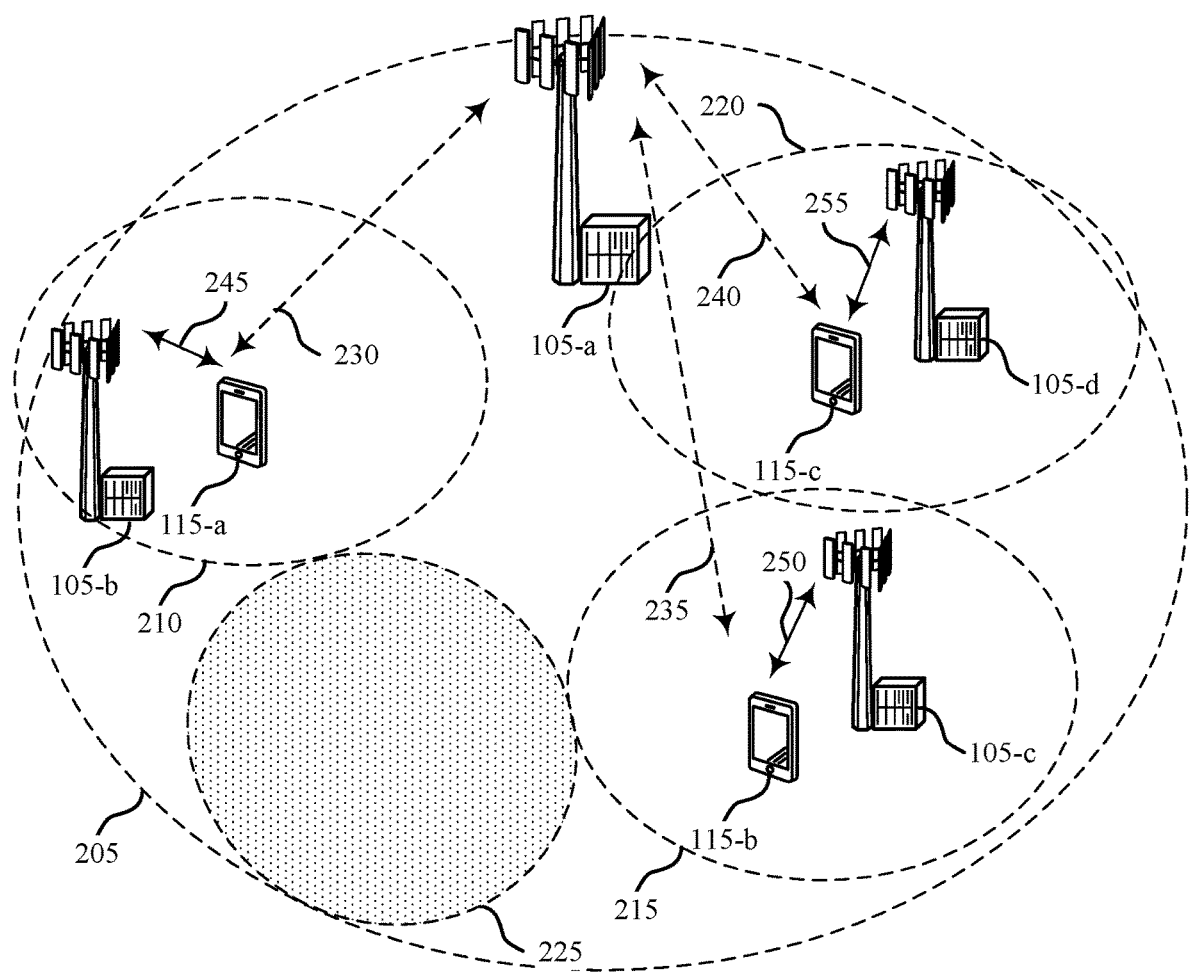
FIG. 2 illustrates an example of a wireless communication system that supports techniques for low-band anchored high-band connections in wireless communications in accordance with aspects of the present disclosure.

FIG. 2 illustrates an example of a wireless communication system 200 that supports techniques for low-band anchored high-band connections in wireless communications in accordance with various aspects of the present disclosure. Wireless communication system 200 may include a first base station 105-a, which may provide low-band connectivity, a number of high-band base stations 105-b, 105-c, and 105-d may provide high-band connectivity, and a number of UEs 115 that may be capable of high-band and low-band communications, which may be examples of the corresponding devices described with reference to FIG. 1. As indicated, the first base station 105-a may have an umbrella coverage area 205 that may provide coverage to each UE 115, a second base station 105-b may provide high-band communications (e.g., mmW communications via directional transmission beams) in a second coverage area 210, a third base station 105-c may provide high-band communications in a third coverage area 215, and a fourth base station 105-d may provide high-band communications in a fourth coverage area 220. In this example, the deployment of the high-band base stations 105-b, 105-c, and 105-d may result in a high-band coverage hole 225, which is a portion of the umbrella coverage area 205 in which a UE 115 may not reliably receive or transmit high-band transmissions.

In some cases, one or more of the UEs 115 may be configured to communicate using both high-band transmissions and low-band transmissions. High-band transmissions may allow a UE to transmit or receive relatively large amounts of data traffic relative to low-band connections. Furthermore, the need at a UE 115 for relatively large amounts of data traffic may change significantly over relatively short periods of time, resulting in bursty traffic patterns. For example, a user of a UE 115 may navigate to a webpage with a large amount of data, such as a 100 MB embedded video file to be transmitted to the UE 115, and then need only minimal data traffic once the large file has been transferred. In other cases, a user of a UE 115 may initiate a session to stream a large file, which can result in a relatively longer need for relatively high data rates. In still other cases, a user may initiate an application that may use a sustained amount of high data rates, such as augmented reality or virtual reality applications, for example.

In order to allow for transitions between high-band communications and low-band communications, some deployments may implement what is referred to as non-stand-alone (NSA) deployments, in which high-band connections are not stand-alone connections, but have an associated low-band connection. Such a low-band connection may be used when a high-band connection is not needed, is not available (e.g., when a UE 115 is located within a high-band coverage hole 225), or is not able to be used at a UE 115. For example, a first UE 115-*a* may be within the second coverage area 210 of second base station 105-*b*. The first base station 105-*a* may establish a low-band connection 230 with the first UE 115-*a*, and the first base station 105-*a* may configure the first UE 115-*a* for high-band connections to any of the second base station 105-*b*, third base station 105-*c*, and fourth base station 105-*d*. The UE 115-*a* may measure received high-band signals (e.g., reference signals transmitted in a synchronization signal (SS) block) and determine that a high-band connection 245 may be established with the second base station 105-*b*. Similarly, a second low-band connection 235 may be established with a second UE 115-*b* and a third low-band connection 240 may be established with a third UE 115-*c*. The second UE 115-*b* may be capable of establishing a second high-band connection 250 with the third base station 105-*c*, and the third UE 115-*c* may be capable of establishing a third high-band connection 255 with the fourth base station 105-*d*.

In such cases, even though a UE 115 may be able to establish a high-band connection, other constraints may weigh against such a connection. For example, from the network side an uplink link budget may be provided to a UE 115 that would not allow a higher power transmission of a high-band transmission. From the UE 115 side, power dissipation or MPE constraints may not allow high-band transmissions. Accordingly, various aspects of the present disclosure provide that UEs 115 may be configured for high-band communications, and may enter a state that allows for efficient signaling and establishment of high-band connections. Such techniques allow for the wireless communication system 200 to maintain UE 115 connectivity and coverage using low-band communications, and to opportunistically activate high-band transmissions only when needed, which may thus reduce power draw at the UEs 115, address transient high-band uplink capabilities at UEs 115 (e.g., shadowing or occlusion where a high-band antenna is temporarily obstructed, MPE considerations, battery state, current context/applications at the UE 115, etc.). In some cases, UEs 115 may enter either a radio resource control (RRC) state or an internal device state that is a high-band activated state, which may have a number of different sub-states depending upon the current conditions at the UE 115, as will be discussed in more detail in FIGS. 3 and 4.

Figure 3:
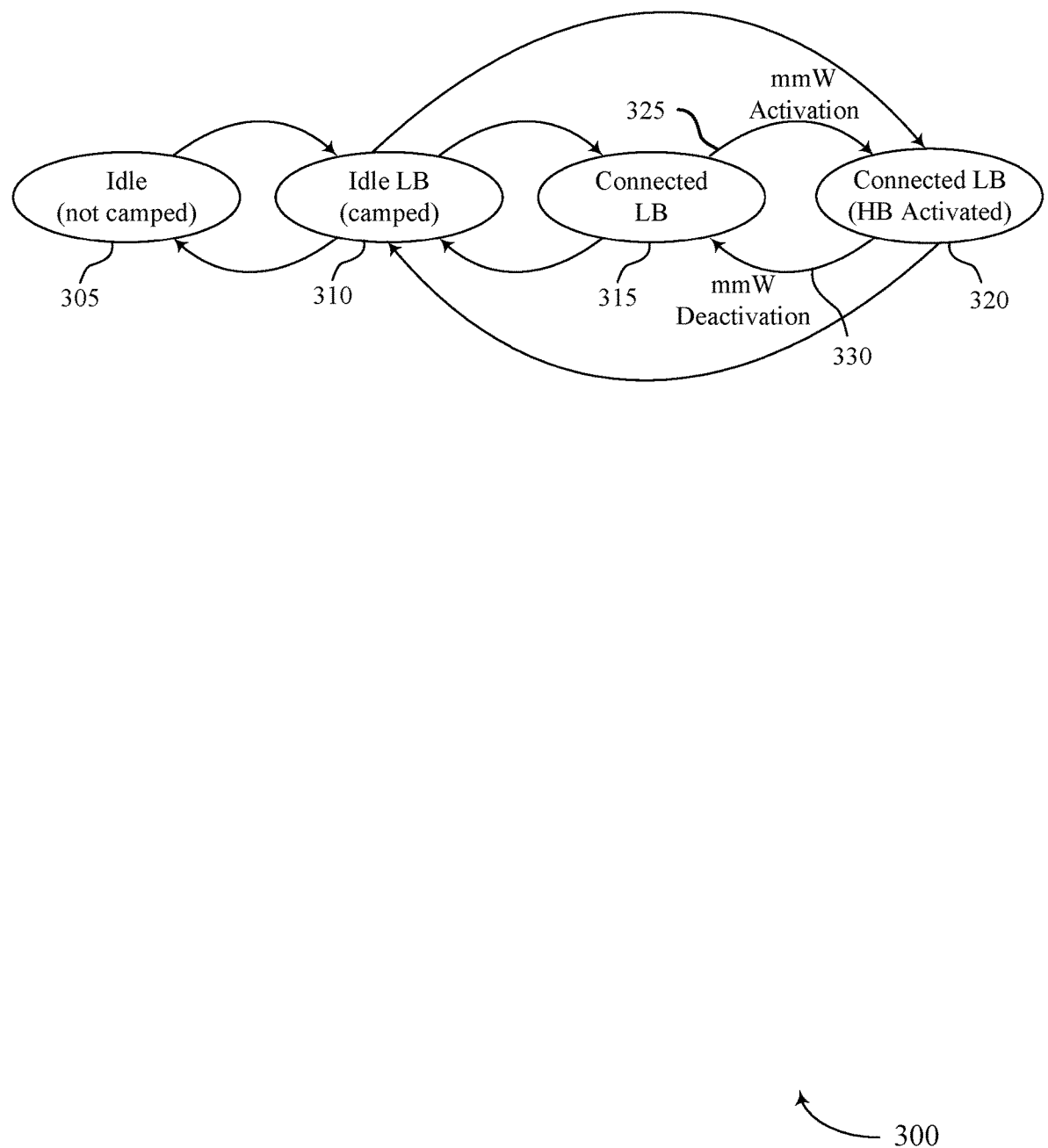
FIG. 3 illustrates an example of a state diagram that supports techniques for low-band anchored high-band connections in wireless communications in accordance with aspects of the present disclosure.

FIG. 3 illustrates an example of a state diagram 300 that supports techniques for low-band anchored high-band connections in wireless communications in accordance with various aspects of the present disclosure. In some examples, state diagram 300 may illustrate states that may be implemented at UEs 115 of wireless communications system 100 or 200. In the example of FIG. 3, a UE may initially be in an idle (not camped) state 305, in which the UE has not established a connection with either a low-band or a high-band base station. The UE may, upon a connection establishment, move to an idle low-band (camped) state 310, in which the UE is camped on a low-band base station. The UE may transition to a connected low-band state 315 when data is to be transmitted between the UE and the serving low-band base station. Such a transmission may be signaled, for example, by RRC signaling from the low-band base station. In some cases, when the UE is in the connected low-band state 315, the base station may pre-configure the UE with a number of high-band base stations that may be monitored and used for a high-band connection.

In the example of FIG. 3, the UE may transition to a connected low-band (high-band activated) state 320. In some cases, the base station may transmit a high-band or mmW activation command 325 to the UE, and the UE enters the connected low-band (high-band activated) state 320 responsive to the activation command 325. In some cases, the UE may perform one or more measurements or evaluations to determine whether a high-band connection can be established, and if so, whether high-band uplink data and/or control transmissions are supported. The UE may exit the connected low-band (high-band activated) state 320 responsive to a high-band or mmW deactivation command 330. In some cases, the UE may enter and exit the connected low-band (high-band activated) state 320 from the idle low-band camped state 310 responsive to a paging message received from the low-band base station.

Thus, in such cases, the UE may camp on a low-band cell or base station, and high-band or mmW communications may be opportunistically activated and deactivated based on current data needs and conditions at the UE. In some cases, the low-band base station may transmit a mmW activation command 325 upon determining that, for example, data traffic at the UE would benefit from a mmW connection. As indicated above, the base station may pre-configure the UE with a set of high-band or mmW base stations or cells. Once the UE receives the mmW activation command 325, the UE may attempt to find and join one of the pre-configured mmW cells. In some cases, different levels of levels of pre-configuration may be provided. For example, such pre-configuration information may include a list of cells and channels that are available for mmW connections, and the UE may measure the configured channels for reference signals from the configured cells. In other cases, the pre-configuration information may include necessary information for the UE to connect to any given cell in any of a number of sub-states that may be selected based on a currently supported mode for high-band communications at the UE, an example of which are discussed with respect to FIG. 4.

Figure 4:
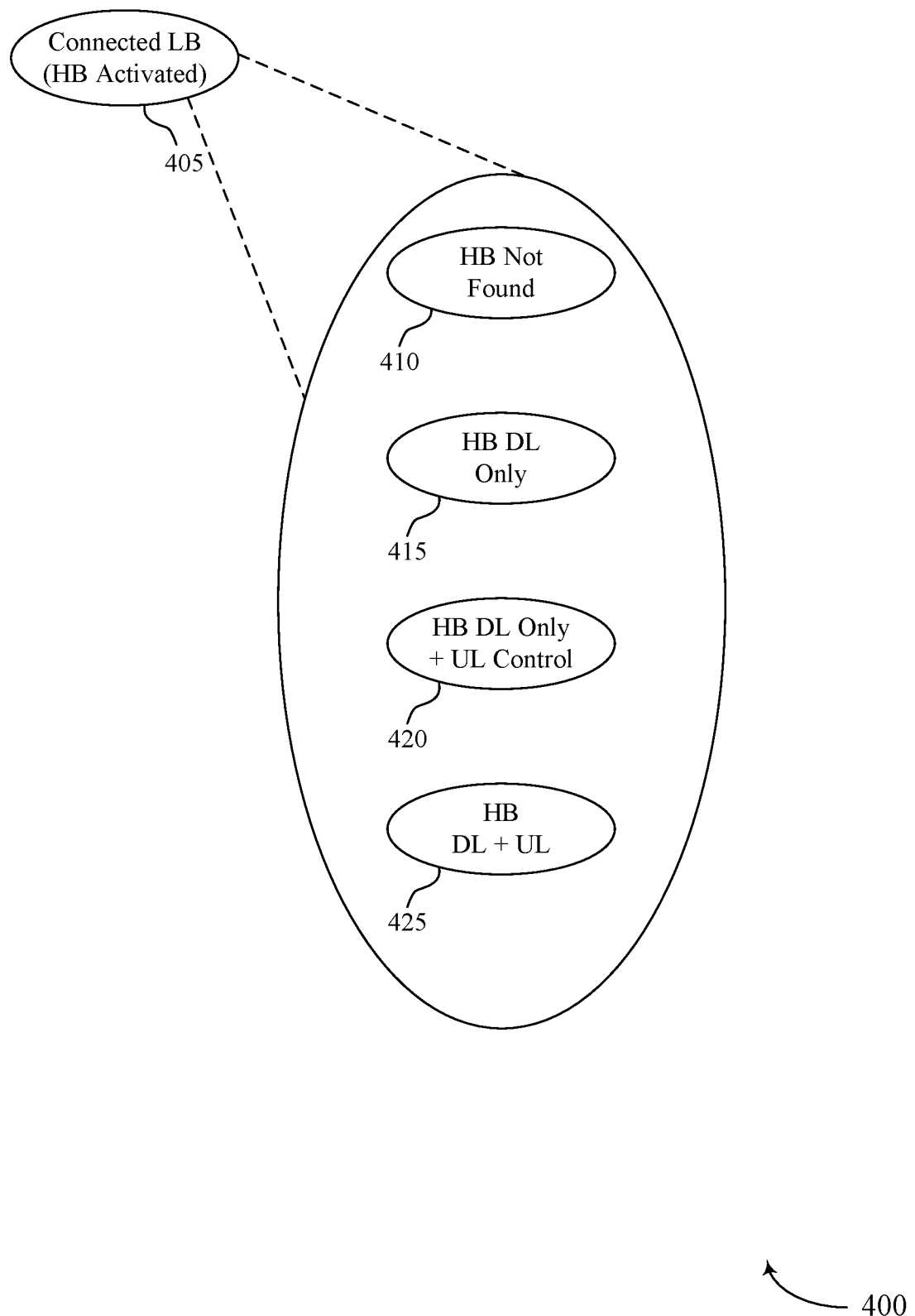
FIG. 4 illustrates an example of another state diagram that supports techniques for low-band anchored high-band connections in wireless communications in accordance with aspects of the present disclosure.

FIG. 4 illustrates an example of a state diagram 400 that supports techniques for low-band anchored high-band connections in wireless communications in accordance with various aspects of the present disclosure. In some examples, state diagram 400 may illustrate states that may be implemented at UEs 115 of wireless communications system 100 or 200. In the example of FIG. 4, a UE may be in a connected low-band (high-band activated) state 405. As discussed above, the UE may enter such a state upon receipt of an activation command while in a connected low-band or idle low-band (camped) state, as discussed above with respect to FIG. 3.

In some cases, upon receiving the activation command, the UE may monitor for reference signals from high-band base stations (e.g., DRS, CSI-RS, UE-RS, etc.) and measure received reference signals (e.g., perform a reference signal received power (RSRP) measurement, or other measurement) to select a high-band base station for an attempt to activate the high-band connection. In some cases, additionally or alternatively, the UE may determine one or more UE parameters that may impact a high-band connection, such as a link budget for uplink transmissions, whether MPE at the UE is at or near a threshold MPE value, a UE battery state, a context of the UE, one or more applications running at the UE, or any combination thereof. Based on the measured reference signals and the current UE parameters, the UE may determine one of a number of sub-states that correspond to a currently supported mode for an activated high-band connection.

In the example of FIG. 4, the UE may enter a high-band not found state 410, if the UE is not able to detect any high-band reference signals having a channel quality that is sufficient to support a high-band connection (e.g., measured RSRP values from high-band transmitters are below a threshold value). In some cases, the high-band not found state 410 may be a result of occlusion/shadowing of a high-band antenna at the UE, and may be a transient condition. This, in some cases, a UE may periodically perform the measurements and/or determinations of the one or more UE parameters. In some cases, a UE may transition from any sub-state to any other sub-state based on the one or more measurements and/or determinations of the UE parameters.

In some cases, the UE may enter a high-band downlink only state 415. Such a state may be entered if, for example, the UE does not have sufficient link budget for high-band uplink transmissions, does not have sufficient battery power to support high-band uplink transmissions, is at an MPE threshold, or any combination thereof. Additionally or alternatively, the UE context/applications may indicate to the UE that high-band uplink transmissions are not needed. In such cases, the UE may operate in a high-band downlink reception mode as the currently supported mode for the activated high-band connection.

In other cases, the UE may enter a high-band downlink only plus uplink control state 420. Such a state may be entered if, for example, the UE does have some link budget for a limited number of high-band uplink transmissions, has sufficient battery power to support a limited number of high-band uplink transmissions, is approaching an MPE threshold, or any combination thereof. Additionally or alternatively, the UE context/applications may indicate to the UE that any data that is to be transmitted may be sufficiently handled by the low-band connection, and thus that high-band uplink data transmissions are not needed but high-band uplink control transmissions may be transmitted. In some cases, high-band uplink control transmissions may be preferable to low-band control transmissions (e.g., if low-band transmissions use shared or unlicensed spectrum it may be more reliable to transmit control using high-band transmissions). In such cases, the UE may operate in a high-band downlink only plus uplink control mode as the currently supported mode for the activated high-band connection.

In the example of FIG. 4, the UE may also enter a high-band downlink plus uplink state 425. Such a state may be entered if, for example, the UE has sufficient link budget link budget for high-band uplink data transmissions, has sufficient battery power to support high-band uplink data transmissions, is below an MPE threshold, or any combination thereof. Additionally or alternatively, the UE context/applications may indicate to the UE that significant amounts of data are likely to be transmitted that may not be sufficiently served by the low-band connection. In some cases, high-band uplink data (and/or control) transmissions may be preferable to low-band transmissions (e.g., if low-band transmissions use shared or unlicensed spectrum it may be more reliable to transmit using high-band transmissions). In such cases, the UE may operate in a high-band downlink plus uplink mode as the currently supported mode for the activated high-band connection.

As indicated, in some cases, transition between UE high-band states 410-425 may happen dynamically while in the connected low-band (high-band activated) state 405, and such a state transition may be signaled to either the high-band base station or low-band base station. In some cases, uplink resources may be provided for uplink transmissions associated with high-band activation. In some cases, such uplink resources may allow for efficient usage overhead and provide timelines for relatively fast signaling of high-band states or high-band state transitions. Further, in some cases uplink resources configured on high-band connections may be preferred in cases where channel access on low-band shared or unlicensed spectrum may have unbounded delays due to contention-based access procedures (e.g., LBT procedures). In some cases, a base station, such as the low-band base station, may reserve uplink resources on both the low-band and high-band connections, that may be used to allow the UE to signal its high-band state. In some cases, the uplink resource may include random access channel (RACH) resources, which may be contention-free RACH resources and/or RACH resources that are provisioned to distinguish UE IDs and UE-states. In some cases, the uplink resources may include, additionally or alternatively to the RACH resources, physical uplink control channel (PUCCH) resources, autonomous UL resources, or combinations thereof.

In some cases, upon receiving an activation command to activate a high-band connection, a UE may determine a preferred high-band base station and the currently supported mode for the activated high-band connection. In cases where high-band connections may be used for uplink signaling, the UE may then transmit a first message (Msg #1), which may be transmitted to the preferred high-band base station using a preferred transmission beam. The first message may include the state of the UE for the high-band connection. The UE may then receive a second message (Msg #2), which may include an acknowledgment from the base station. In some cases, the second message may also include an RRC reconfiguration command to reconfigure the high-band connection. The UE may then, in some cases, transmit a third message (Msg #3), which may be a RRC reconfiguration complete message, following which data transmissions may be transmitted using the high-band connection, based on high-band base station provisioned resources for the UE that correspond to the communicated state of the UE.

In some cases, uplink resources may be configured on the low-band connection. In some cases, low-band resources may be provided for signaling following the high-band activation message. In some cases, the low-band resources may be periodically configured to allow a UE to transmit when a high-band connection is not available or usable by the UE. In such cases, following the determination of the preferred high-band base station and the currently supported mode for the activated high-band connection, the UE may then transmit a first message (Msg #1), which may indicate, for example, a preferred high-band base station, a preferred high-band beam identification, a UE high-band state (e.g., high-band downlink only, high-band fail, etc.). The UE may then receive a second message (Msg #2), which may include an acknowledgment from the low-band base station. In some cases, the second message may also include an RRC reconfiguration command to reconfigure the high-band connection. The UE may then, in some cases, transmit a third message (Msg #3), which may be a RRC reconfiguration complete message, following which data transmissions may be transmitted using the high-band connection, the low-band connection, or combinations thereof (e.g., high-band downlink transmissions and low-band uplink transmissions), based on provisioned resources for the UE that correspond to the communicated state of the UE.

Figure 5:
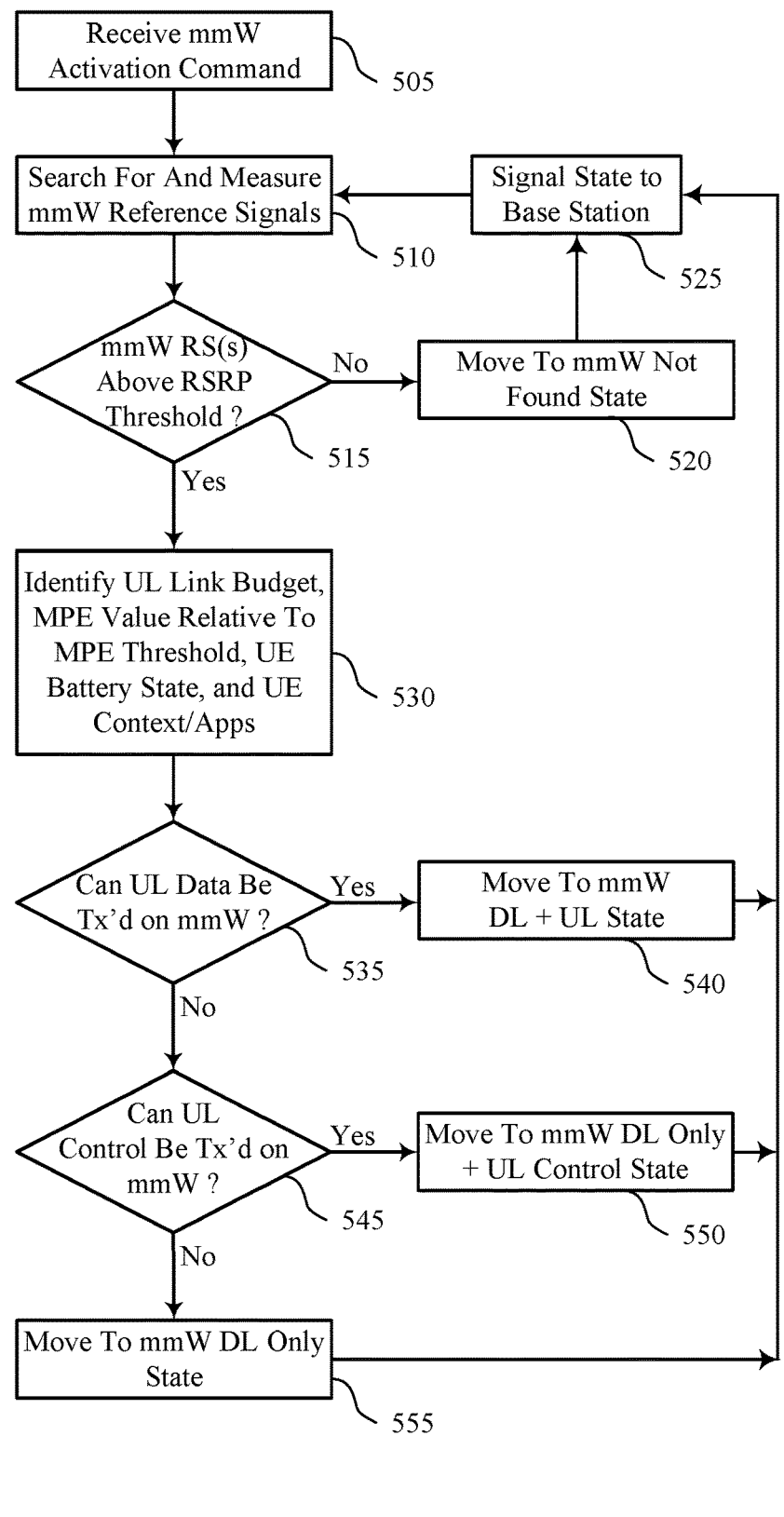
FIG. 5 is a flow chart that illustrates techniques for low-band anchored high-band connections in wireless communications in accordance with aspects of the present disclosure.

FIG. 5 is a flow chart 500 that illustrates techniques for low-band anchored high-band connections in wireless communications in accordance with various aspects of the present disclosure. In some examples, flow chart 500 may implement aspects of wireless communications systems 100 or 200. It is noted that, while the example of FIG. 5 describes mmW high-band communications, such techniques also apply to any system that may use a first frequency band for an anchor connection (referred to as a low-band or sub-6 connection herein) and a second frequency band for a second connection (referred to as a high-band or mmW connection herein).

In this example, at 505, a UE may receive a mmW activation command. As discussed above, the activation command may be received from a low-band base station while the UE is in a connected low-band state. In some cases, the mmW activation command may be received in RRC signaling from the low-band base station, and the UE may enter a connected low-band (high-band activated) state responsive to receiving the mmW activation command. In some cases, the connected low-band (high-band activated) state may be an RRC state that is signaled by the low-band base station. In other cases, the connected low-band (high-band activated) state may be an internal device state at the UE. In some cases, the mmW activation command may be received via a paging message while the UE is in an idle low-band (camped) state.

At 510, the UE may search for and measure one or more mmW reference signals. In some cases, the mmW reference signals may include a DRS, a CSI-RS, a UE-RS, or any combination thereof. In some cases, the UE may be pre-configured by a low-band base station with channels to monitor, timing for monitoring, high-band base station IDs, etc. In some cases, the reference signals may be transmitted by high-band base stations according to a beam-sweep procedure. In some cases, the reference signals may be transmitted in a SS block transmission from the high-band base stations, and each SS block may have associated uplink resources that may be used for a subsequent uplink transmission from the UE that selects the high-band base station and a preferred transmission beam.

At 515, the UE may determine whether one or more reference signals is above a threshold value. In some case, the threshold value may be a predetermined RSRP threshold, with values below the threshold indicating that high-band connection should not be attempted for a particular base station and beam, and values above the threshold indicating that a reliable high-band connection may be established. In some cases, if multiple reference signals exceed the threshold value, the UE may select a beam and base station with a highest value or that is otherwise preferred.

If no reference signals have an RSRP above the RSRP threshold the UE, at 520, may move to a mmW or high-band not found state. The UE may, at 525, signal the state to the base station, such as the low-band base station in this state. In some cases, the UE may repeat the operations at 510 to continue to search and measure reference signals. In some cases, the UE may signal that it is in the mmW not found state to the low-band base station by using configured resources for uplink transmissions from the UE.

If a reference signal is measured that is above the RSRP threshold the UE, at 530, may identify one or more UE parameters for use in determining the UE state. In some examples, the UE parameters may include on or more of a link budget parameters, a MPE value relative to an MPE threshold, a UE battery state, UE context, UE applications, or combinations thereof.

At 535, the UE may determine whether uplink data can be transmitted using a high-band or mmW connection. Such a determination may be made, as discussed above, based on whether a UE link budget would permit such uplink transmissions, whether the UE has sufficient battery state to support mmW uplink transmissions, current MPE values, and the like. If the UE determines that uplink data can be transmitted using mmW transmissions, the UE may move to a mmW downlink plus uplink state, as indicated at 540. Such a state may indicate that the UE is able to transmit and receive high-band transmissions without any constraints. The UE may then perform the operations at 525 to signal the state to a base station and, in some examples, periodically re-initiate the operations of 510.

If the UE determines at 535 that high-band uplink data transmissions are not supported, the UE may, at 545, determine whether uplink control information can be transmitted using a high-band or mmW connection. Such a determination may be made, as discussed above, based on whether a UE link budget would permit such uplink transmissions, whether the UE has sufficient battery state to support mmW uplink transmissions, current MPE values, and the like. If the UE determines that uplink control information can be transmitted using mmW transmissions, the UE may move to a mmW downlink only plus uplink control state, as indicated at 550. Such a state may indicate that the UE is able to receive high-band transmissions without any constraints but only transmit uplink control information using high-band uplink transmissions. The UE may then perform the operations at 525 to signal the state to a base station and, in some examples, periodically re-initiate the operations of 510.

If the UE determines at 545 that high-band uplink control information transmissions are not supported, the UE may, at 555, move to a mmW downlink only state. Such a state may indicate that the UE is unable to transmit high-band transmissions, but can receive high-band transmissions. The UE may then perform the operations at 525 to signal the state to a base station and, in some examples, periodically re-initiate the operations of 510.

Figure 6:
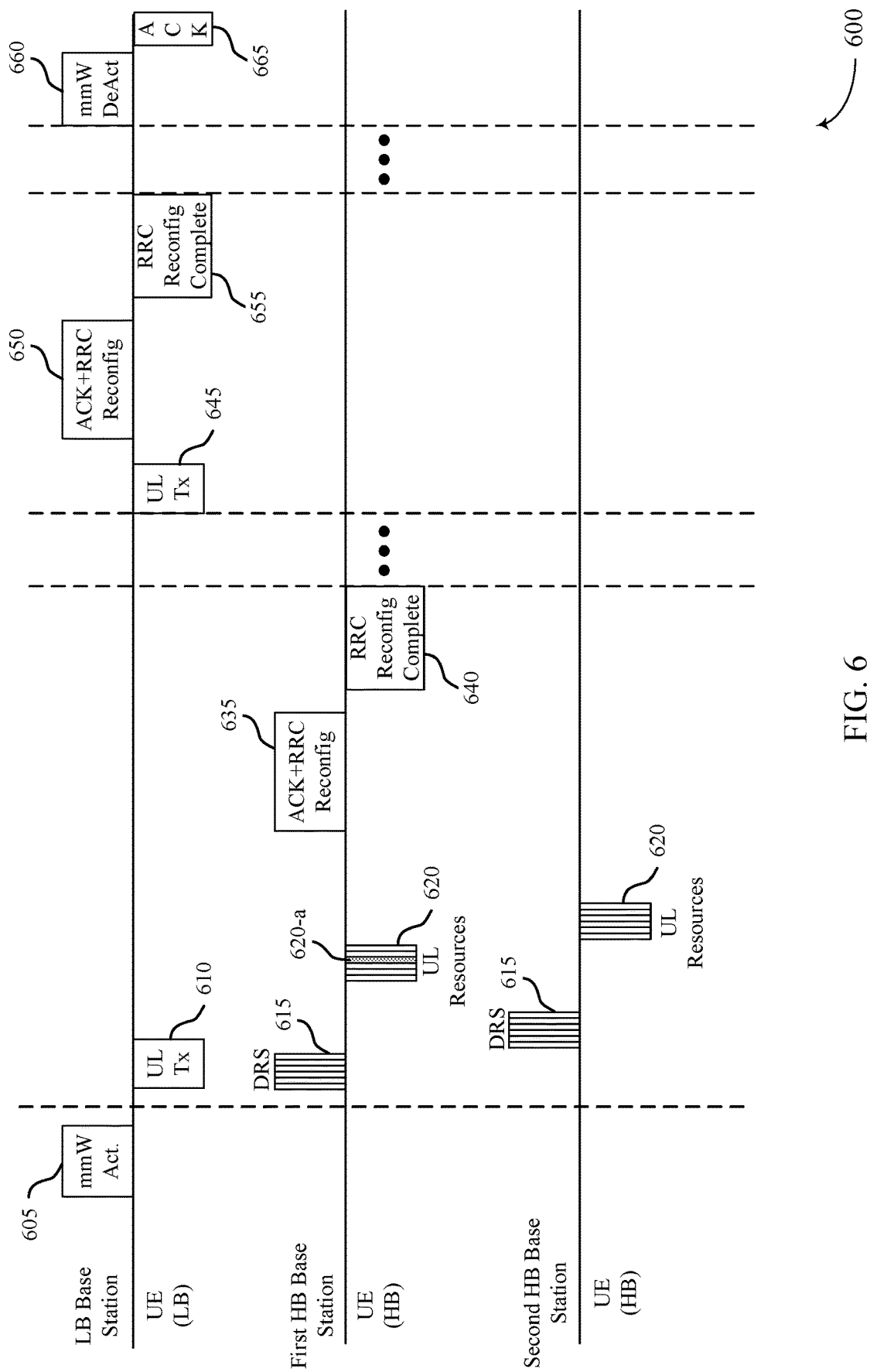
FIG. 6 illustrates an example of uplink and downlink transmissions that support techniques for low-band anchored high-band connections in wireless communications in accordance with aspects of the present disclosure.

FIG. 6 illustrates an example of uplink and downlink transmissions 600 that support techniques for low-band anchored high-band connections in wireless communications in accordance with various aspects of the present disclosure. In some examples, uplink and downlink transmissions 600 may implement aspects of wireless communications systems 100 or 200.

In this example, a UE may be initially in a low-band connected state, and may receive, from a low-band base station, a mmW activation command 605 in a downlink transmission from the low-band base station. As indicated above, the UE may be pre-configured with a set of mmW cells and channels prior to receiving the mmW activation command 605. The UE may acknowledge the activation command in uplink transmission 610, and may monitor for reference signal transmissions 615 of high-band base stations. In some cases, the high-band reference signal transmissions 615 may be DRS transmissions that are transmitted in SS blocks according to a beam-sweep procedure. The UE may identify a high-band base station and preferred beam based on measurements of the reference signal transmissions 615.

In this example, the UE may determine that it can connect to a first high-band base station. The UE may also determine a mmW or high-band state based on one or more UE parameters, as discussed above. Upon selection of a base station, beam, and high-band state, mmW activation is completed via an RRC reconfiguration operation, in which the UE may transmit an uplink transmission 620-*a* in configured uplink resources 620. In some cases, the resources for the uplink transmission 620-*a* may be selected based on a particular beam or SS block that is preferred at the UE. In some cases, the uplink resources 620 may be RACH resources, PUCCH resources, autonomous uplink resources, or combinations thereof. The RRC reconfiguration operation may include a downlink transmission 635 from the high-band base station with an acknowledgment and an RRC reconfiguration command. The UE may identify the RRC reconfiguration and transmit an uplink transmission 640 to indicate the RRC reconfiguration is complete. In some cases, the high-band base station may limit the UE to a subset of UE determined states via the RRC reconfiguration command. In this example, either the low-band base station or the high-band base station may provision uplink resources on both low-band and mmW for the UE to indicate a switch in state, and the UE may continue to perform measurements and update its high-band or mmW state until mmW is de-activated by the base station.

In the example of FIG. 6, the UE may determine at some point following the uplink transmission 640 that high-band transmissions are no longer available at the UE (e.g., due to moving out of a mmW coverage area, occlusion/shadowing of a UE antenna, link budget constraints, UE battery state, MPE considerations, etc.). In this example, the UE may then transmit uplink transmission 645 using low-band provisioned uplink resources to indicate a change in the UE state. The low-band base station may then acknowledge the change of state and provide a RRC reconfiguration command 650 to the UE. The UE may reconfigure its RRC connections, and transmit a RRC reconfiguration complete message 655 using low-band uplink resources. In some cases, different state transitions may be signaled to the low-band base station or high-band base station, until a mmW deactivation command 660 is received. In this example, the low-band base station transmits the mmW deactivation command 660, and the UE may transmit acknowledgement 665 responsive thereto.

Figure 7:
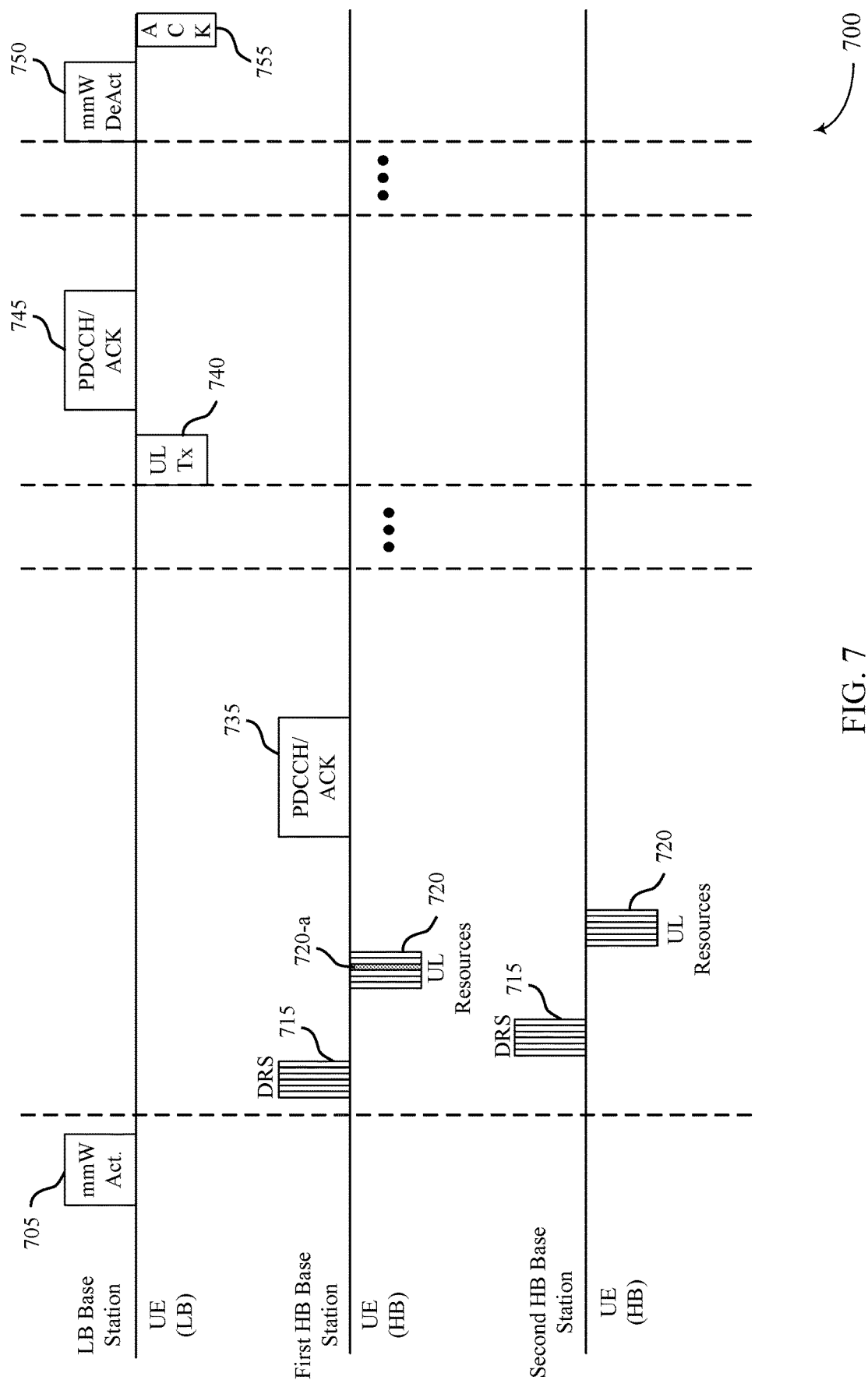
FIG. 7 illustrates another example of uplink and downlink transmissions that support techniques for low-band anchored high-band connections in wireless communications in accordance with aspects of the present disclosure.

FIG. 7 illustrates an example of uplink and downlink transmissions 700 that support techniques for low-band anchored high-band connections in wireless communications in accordance with various aspects of the present disclosure. In some examples, uplink and downlink transmissions 700 may implement aspects of wireless communications systems 100 or 200. In this example, similar techniques as discussed in FIG. 6 are described, and upon selection of a high-band base station, beam, and transmission of UE state (e.g., via RACH resources), mmW Activation is assumed complete upon receipt of an ACK (e.g., on PDCCH) from the high-band base station, and additional RRC reconfiguration signaling is not transmitted.

More specifically, in this example a UE may be initially in a low-band connected state, and may receive, from a low-band base station, a mmW activation command 705 in a downlink transmission from the low-band base station. As indicated above, the UE may be pre-configured with a set of mmW cells and channels prior to receiving the mmW activation command 705. The UE may acknowledge the activation command in uplink transmission 710, and may monitor for reference signal transmissions 715 of high-band base stations. In some cases, the high-band reference signal transmissions 715 may be DRS transmissions that are transmitted in SS blocks according to a beam-sweep procedure. The UE may identify a high-band base station and preferred beam based on measurements of the reference signal transmissions 715.

In this example, the UE may determine that it can connect to a first high-band base station. The UE may also determine a mmW or high-band state based on one or more UE parameters, as discussed above. Upon selection of a base station, beam, and high-band state, mmW activation is completed via an RRC reconfiguration operation, in which the UE may transmit an uplink transmission 720-*a* in configured uplink resources 720. In some cases, the resources for the uplink transmission 720-*a* may be selected based on a particular beam or SS block that is preferred at the UE. In some cases, the uplink resources 720 may be RACH resources, PUCCH resources, autonomous uplink resources, or combinations thereof. The RRC reconfiguration operation may include a downlink transmission 735 from the high-band base station with an acknowledgment, which may signal to the UE that the RRC reconfiguration is to be completed. In some cases, the high-band base station may limit the UE to a subset of UE determined states via a PDCCH or ACK downlink transmission 735. In this example, either the low-band base station or the high-band base station may provision uplink resources on both low-band and mmW for the UE to indicate a switch in state, and the UE may continue to perform measurements and update its high-band or mmW state until mmW is de-activated by the base station.

In the example of FIG. 7, the UE may determine at some point following the downlink transmission 735 that high-band transmissions are no longer available at the UE (e.g., due to moving out of a mmW coverage area, occlusion/shadowing of a UE antenna, link budget constraints, UE battery state, MPE considerations, etc.). In this example, the UE may then transmit uplink transmission 740 using low-band provisioned uplink resources to indicate a change in the UE state. The low-band base station may then acknowledge the change of state in downlink transmission 745 and the UE may reconfigure its RRC connections responsive to the acknowledgment in downlink transmission 745. In some cases, different state transitions may be signaled to the low-band base station or high-band base station, until a mmW deactivation command 750 is received. In this example, the low-band base station transmits the mmW deactivation command 750, and the UE may transmit acknowledgement 755 responsive thereto.

Figure 8:
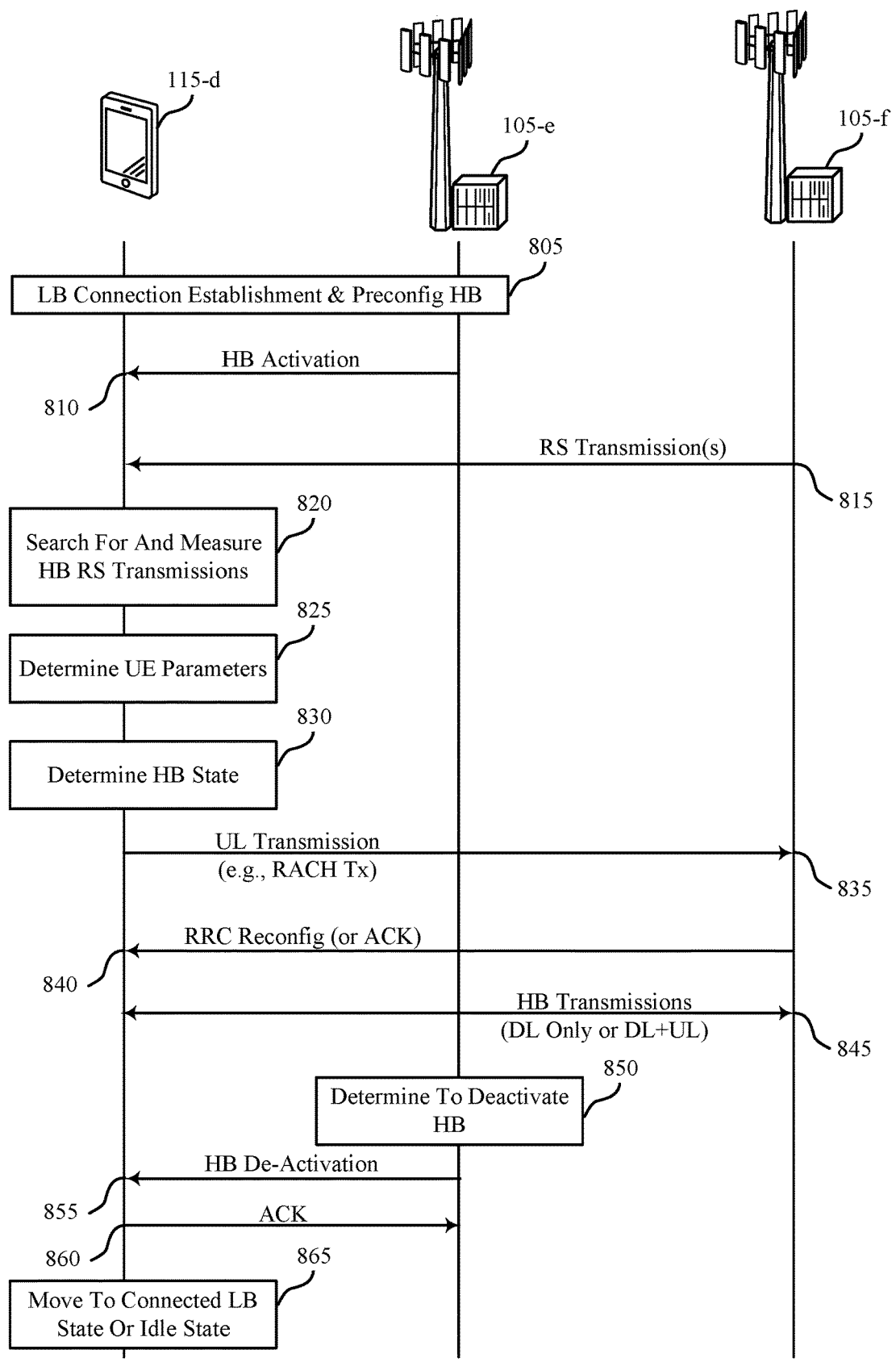
FIG. 8 illustrates an example of a process flow that supports techniques for low-band anchored high-band connections in wireless communications in accordance with aspects of the present disclosure.

FIG. 8 illustrates an example of a process flow 800 that supports techniques for low-band anchored high-band connections in wireless communications in accordance with various aspects of the present disclosure. In some examples, process flow 800 may implement aspects of wireless communications systems 100 or 200. Process flow 800 may include a low-band base station 105-*e*, a high-band base station 105-*f*, and a UE 115-*d*.

Initially, at 805, the UE 115-*d* and the low-band base station 105-*e* may establish a low band connection. In some cases, the low-band base station 105-*e* may pre-configure the UE 115-*d* with high-band configuration information associated with the second (high-band) base station 105-*f* and optionally one or more other high-band base stations. The low-band base station 105-*e* may determine that a high-band connection is to be activated at the UE 115-*d* (e.g., based on buffered data that is to be transmitted to the UE 115-*d*, a BSR from the UE 115-*d*, one more applications or services of the UE, etc.). The low-band base station 105-e may transmit a high-band activation command 810 to the UE.

The high-band base station 105-f may transmit reference signal transmission(s) 815 that may be received at the UE 115-d. In some cases, the high-band base station 105-f may coordinate with the low-band base station 105-e to transmit the reference signal transmission(s) 815 during some time window after the low-band base station transmits the high-band activation command 810. In other cases, the high-band base station 105-f may transmit the reference signal transmission(s) 815 according to a pre-determined periodic reference signal transmission irrespective of the high-band activation command 810. In some cases, the reference signal transmission(s) may be DRS transmissions transmitted in SS blocks according to a beam-sweep procedure. In some cases, the reference signal transmission(s) may be CSI-RS or UE-RS transmissions.

At 820, the UE 115-d may search for and measure the high-band reference signal transmission(s) 815. In some cases, the UE 115-d may measure a RSRP for a number of reference signals and select a base station and preferred beam based at least in part on the measured RSRP values.

At 825, the UE may determine UE parameters associated with high-band transmissions. Such UE parameters may include, for example, a link budget for uplink transmissions, whether MPE at the UE 115-d is at or near a threshold MPE value, a UE 115-d battery state, a context of the UE 115-d, one or more applications running at the UE 115-d, or any combination thereof.

At 830, the UE 115-d may determine its high-band state. Such a determination may be based at least in part on the measurements of the high-band reference signals, the determined UE parameters, or any combination thereof. In some cases, the high-band state of the UE 115-d may be selected from a high-band not found state, a high-band downlink only state (e.g., when a power budget, battery level, or exposure limits at the UE 115-d may not allow high-band transmissions), a high-band downlink only plus uplink control state (e.g., when a power budget, battery level, or exposure limits at the UE 115-d may allow only limited high-band transmissions), or a high-band uplink and downlink state (e.g., when a power budget, battery level, or exposure limits at the UE 115-d allow unconstrained high-band transmissions).

The UE 115-d may signal the identified high-band base station 105-f and preferred beam, along with the determined high-band state, in an uplink transmission 835 to the high-band base station 105-f. In some examples, the uplink transmission 835 may be transmitted using RACH resources. In other cases, PUCCH or autonomous uplink resources may be used for uplink transmission 835. While the example of FIG. 8 shows the uplink transmission 835 transmitted to the high-band base station 105-f, in other examples the uplink transmission 835 may be transmitted to the low-band base station 105-e using configured uplink resources.

The high-band base station may transmit an RRC reconfiguration message 840 to the UE 115-d to reconfigure the high-band connection. In some cases, the high-band base station 105-f may simply transmit an acknowledgment to the UE 115-d, and a high-band reconfiguration may be assumed. Following the high-band reconfiguration at the UE 115-d, the UE 115-d and high-band base station 105-f may transmit high-band transmissions 845 according to the identified UE state.

At 850, the low-band base station 105-e may determine that the high-band connection is to be deactivated. Such a determination may be made based on a number of factors, such as a data buffer associated with the UE 115-d, the applications running or active services at the UE 115-d, reported UE 115-d state, other factors, or combinations thereof. In some cases, the high-band base station 105-f may make such a determination 850 either alone, or in conjunction with the low-band base station 105-e. A high band deactivation command 855 may be transmitted to the UE 115-d, and the UE 115-d may deactivate the high-band connection and transmit an acknowledgment 860 to acknowledge receipt of the deactivation command. The UE 115-d may then, at 865, move out of a low-band connected (high-band active) state to a low-band connected state or low-band idle (camped) state, as discussed above.

Figure 9:
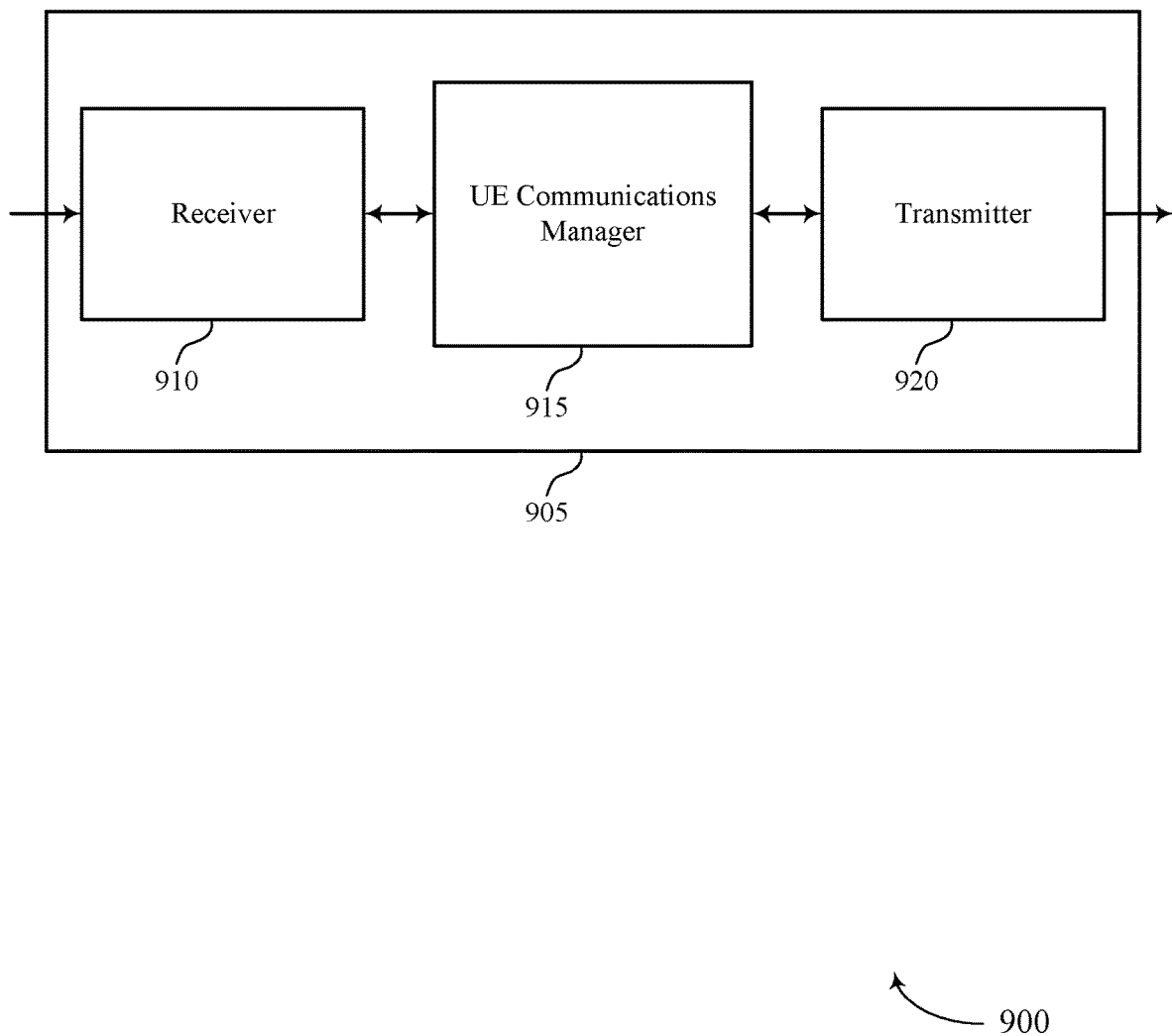
FIGS. 9 through 11 show block diagrams of a device that supports techniques for low-band anchored high-band connections in wireless communications in accordance with aspects of the present disclosure.

FIG. 9 shows a block diagram 900 of a wireless device 905 that supports techniques for low-band anchored high-band connections in wireless communications in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for low-band anchored high-band connections in wireless communications, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may establish a low-band connection with a base station, receive, from the base station via the low-band connection, configuration information for one or more high-band connections, receive an activation command from the base station to activate one of the one or more high-band connections, determine a currently supported mode for an activated high-band connection, and transmit an indication to the base station of the currently supported mode for the activated high-band connection.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
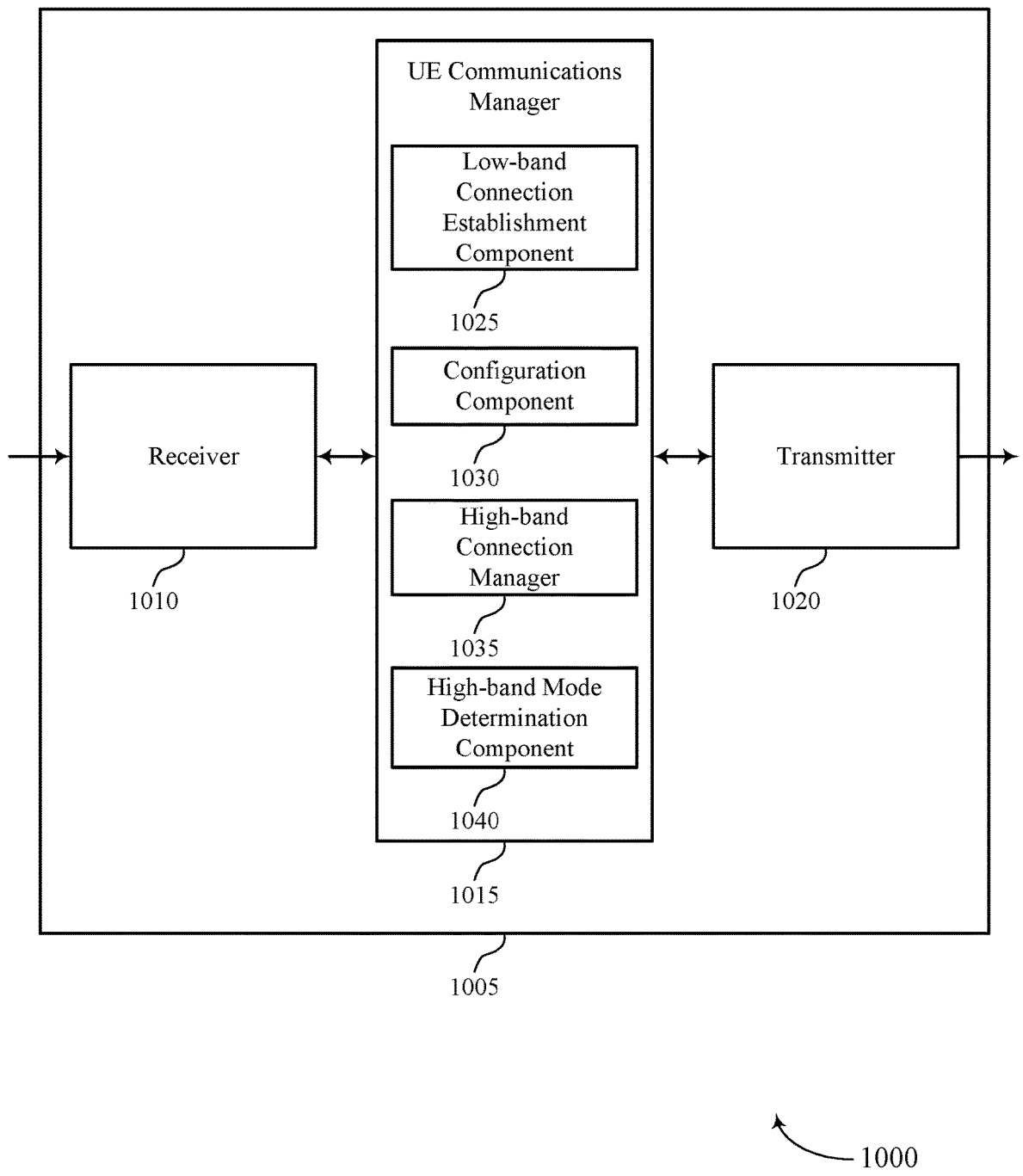

FIG. 10 shows a block diagram 1000 of a wireless device 1005 that supports techniques for low-band anchored high-band connections in wireless communications in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for low-band anchored high-band connections in wireless communications, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include low-band connection establishment component 1025, configuration component 1030, high-band connection manager 1035, and high-band mode determination component 1040.

Low-band connection establishment component 1025 may establish a low-band connection with a base station. As discussed above, the low-band connection may be established according to connection establishment techniques with a low-band base station that has umbrella low-band coverage over a number of different high-band coverage areas.

Configuration component 1030 may receive, from the base station via the low-band connection, configuration information for one or more high-band connections. In some cases, the one or more high-band connections use millimeter wave (mmW) frequencies, and the low-band connection using lower frequencies than the mmW frequencies.

High-band connection manager 1035 may manage various aspects of high-band connections and reporting of high-band states. In some cases, the high-band connection manager 1035 may receive an activation command from the base station to activate one of the one or more high-band connections, and identify a first high-band transmitter for establishing the high-band connection. In some cases, the high-band connection manager 1035 may transmit an indication of a selected high-band base station and beam, and may also indicate a high-band connection state based on a currently supported mode for an activated high-band connection. In some cases, the high-band connection manager 1035 may transmit a subsequent indication to the base station to indicate the change in the currently supported mode for the activated high-band connection. In some cases, the high-band connection manager 1035 may transmit a random access request to a first high-band transmitter, receive an acknowledgment that the random access request was successfully received, receive a reconfiguration message to configure the activated high-band connection, reconfigure active connections based on the reconfiguration message, and transmit a reconfiguration complete message to the first high-band transmitter. Additionally or alternatively, the high-band connection manager 1035 may receive a deactivation command to deactivate the activated high-band connection, and deactivate the activated high-band connection responsive to the deactivation command.

In some cases, the high-band connection manager 1035 may transmit an indication to the base station of the currently supported mode for the activated high-band connection, and transmit a second indication to the base station based on the re-evaluated currently supported mode for the activated high-band connection, where the second indication is transmitted periodically or upon a change in the currently supported mode for the activated high-band connection. In some cases, the receiving the activation command from the base station includes receiving an indication that a high-band connection is to be activated, and the high-band connection manager 1035 may monitor for a high-band transmission from one or more base stations based on configuration information for the one or more high-band connections.

High-band mode determination component 1040 may determine a currently supported mode for an activated high-band connection, and may periodically re-evaluate the currently supported mode for the activated high-band connection. In some cases, the currently supported mode for the activated high-band connection is determined based on one or more channel parameters, the one or more UE parameters, or any combination thereof. In some cases, the currently supported mode for the activated high-band connection is selected from a high-band connection not found mode, a high-band downlink only mode, a high-band downlink only with uplink control mode, or a high-band downlink and uplink mode.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
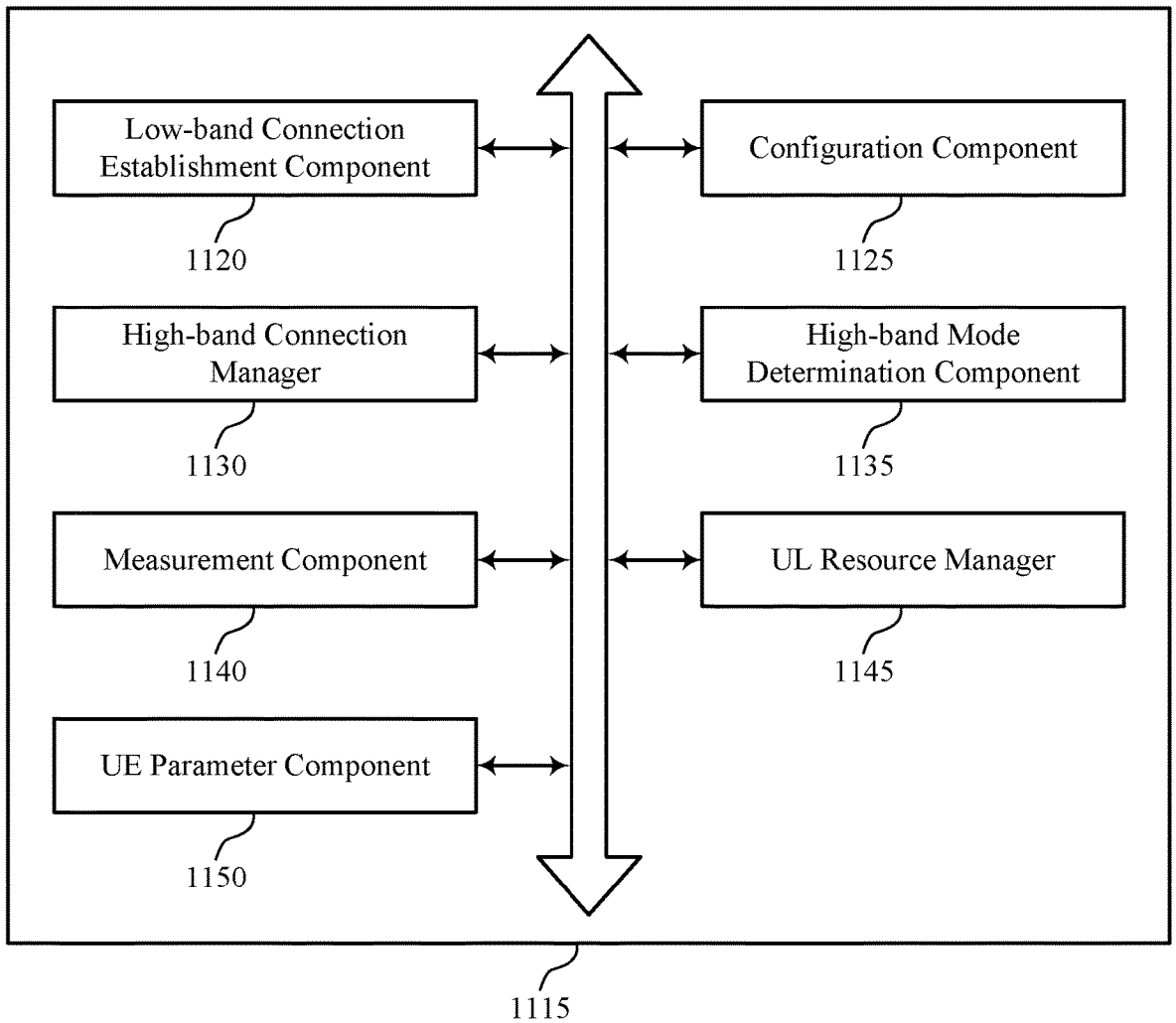

FIG. 11 shows a block diagram 1100 of a UE communications manager 1115 that supports techniques for low-band anchored high-band connections in wireless communications in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include low-band connection establishment component 1120, configuration component 1125, high-band connection manager 1130, high-band mode determination component 1135, measurement component 1140, uplink (UL) resource manager 1145, and UE parameter component 1150. Each of these modules may communicate, directly or indirectly, with one another (e.g., via one or more buses).

Low-band connection establishment component 1120 may establish a low-band connection with a base station. As discussed above, the low-band connection may be established according to connection establishment techniques with a low-band base station that has umbrella low-band coverage over a number of different high-band coverage areas.

Configuration component 1125 may receive, from the base station via the low-band connection, configuration information for one or more high-band connections. In some cases, the one or more high-band connections use millimeter wave (mmW) frequencies, and the low-band connection using lower frequencies than the mmW frequencies.

High-band connection manager 1130 may manage various aspects of high-band connections and reporting of high-band states. In some cases, the high-band connection manager 1130 may receive an activation command from the base station to activate one of the one or more high-band connections, and identify a first high-band transmitter for establishing the high-band connection. In some cases, the high-band connection manager 1130 may transmit an indication of a selected high-band base station and beam, and may also indicate a high-band connection state based on a currently supported mode for an activated high-band connection. In some cases, the high-band connection manager 1130 may transmit a subsequent indication to the base station to indicate the change in the currently supported mode for the activated high-band connection. In some cases, the high-band connection manager 1130 may transmit a random access request to a first high-band transmitter, receive an acknowledgment that the random access request was successfully received, receive a reconfiguration message to configure the activated high-band connection, reconfigure active connections based on the reconfiguration message, and transmit a reconfiguration complete message to the first high-band transmitter. Additionally or alternatively, the high-band connection manager 1130 may receive a deactivation command to deactivate the activated high-band connection, and deactivate the activated high-band connection responsive to the deactivation command.

In some cases, the high-band connection manager 1130 may transmit an indication to the base station of the currently supported mode for the activated high-band connection, and transmit a second indication to the base station based on the re-evaluated currently supported mode for the activated high-band connection, where the second indication is transmitted periodically or upon a change in the currently supported mode for the activated high-band connection. In some cases, the receiving the activation command from the base station includes receiving an indication that a high-band connection is to be activated, and the high-band connection manager 1130 may monitor for a high-band transmission from one or more base stations based on configuration information for the one or more high-band connections.

High-band mode determination component 1135 may determine a currently supported mode for an activated high-band connection, and may periodically re-evaluate the currently supported mode for the activated high-band connection. In some cases, the currently supported mode for the activated high-band connection is determined based on one or more channel parameters, the one or more UE parameters, or any combination thereof. In some cases, the currently supported mode for the activated high-band connection is selected from a high-band connection not found mode, a high-band downlink only mode, a high-band downlink only with uplink control mode, or a high-band downlink and uplink mode.

Measurement component 1140 may measure, responsive to receiving the activation command, one or more reference signals associated with the one or more high-band connections. In some cases, the one or more reference signals include one or more of a UE specific reference signal, a discovery reference signal (DRS), a channel state information reference signal (channel state information (CSI)-RS), or any combination thereof. In some cases, the one or more reference signals are transmitted responsive to the activation command, are broadcast reference signals, or any combination thereof. In some cases, the determining the currently supported mode for the activated high-band connection includes: measuring one or more channel parameters for the one or more high-band connections. In some cases, the one or more channel parameters include one or more of a reference signal received power (RSRP) of one or more high-band transmissions, a beam direction of one or more high-band transmissions, a channel quality measurement of one or more high-band transmissions, or any combination thereof.

UL resource manager 1145 may transmit the indication using the identified uplink resources. In some cases, the transmitting the indication includes identifying uplink resources of the low-band connection or the activated high-band connection for transmitting the indication, the uplink resources including one or more of random access resources, contention free random access resources, partitioned random access resources with partitions based on an identification of the currently supported mode, uplink control channel resources, autonomous uplink resources, or any combination thereof.

UE parameter component 1150 may identify one or more UE parameters associated with transmissions for the activated high-band connection. In some cases, the one or more UE parameters include one or more of a power link budget for high-band transmissions, a maximum permissible exposure (MPE) threshold for high-band transmissions, a UE battery state, a UE context and currently running applications, or any combination thereof.

Figure 12:
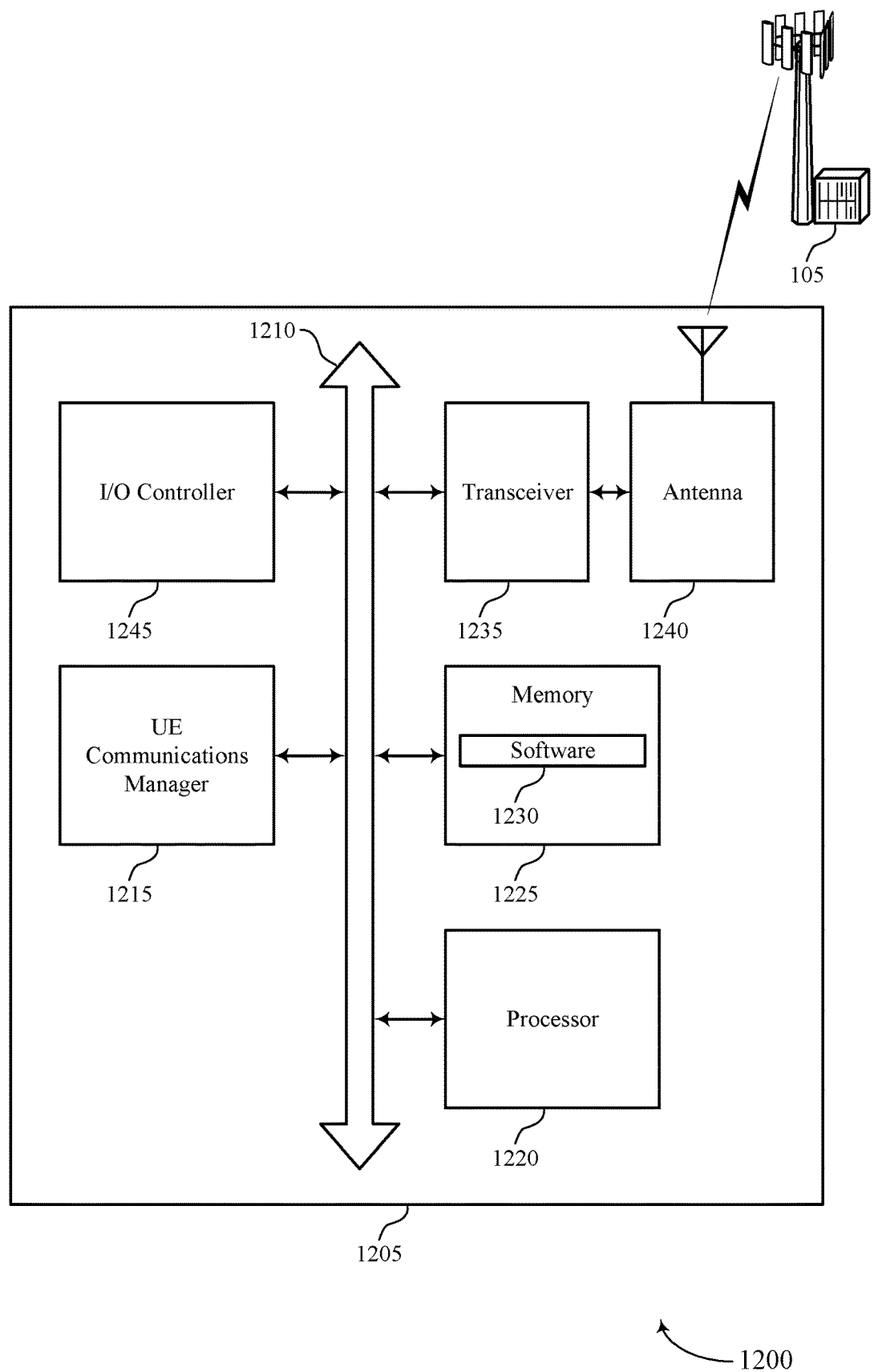
FIG. 12 illustrates a block diagram of a system including a UE that supports techniques for low-band anchored high-band connections in wireless communications in accordance with aspects of the present disclosure.

FIG. 12 shows a diagram of a system 1200 including a device 1205 that supports techniques for low-band anchored high-band connections in wireless communications in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting techniques for low-band anchored high-band connections in wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support techniques for low-band anchored high-band connections in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
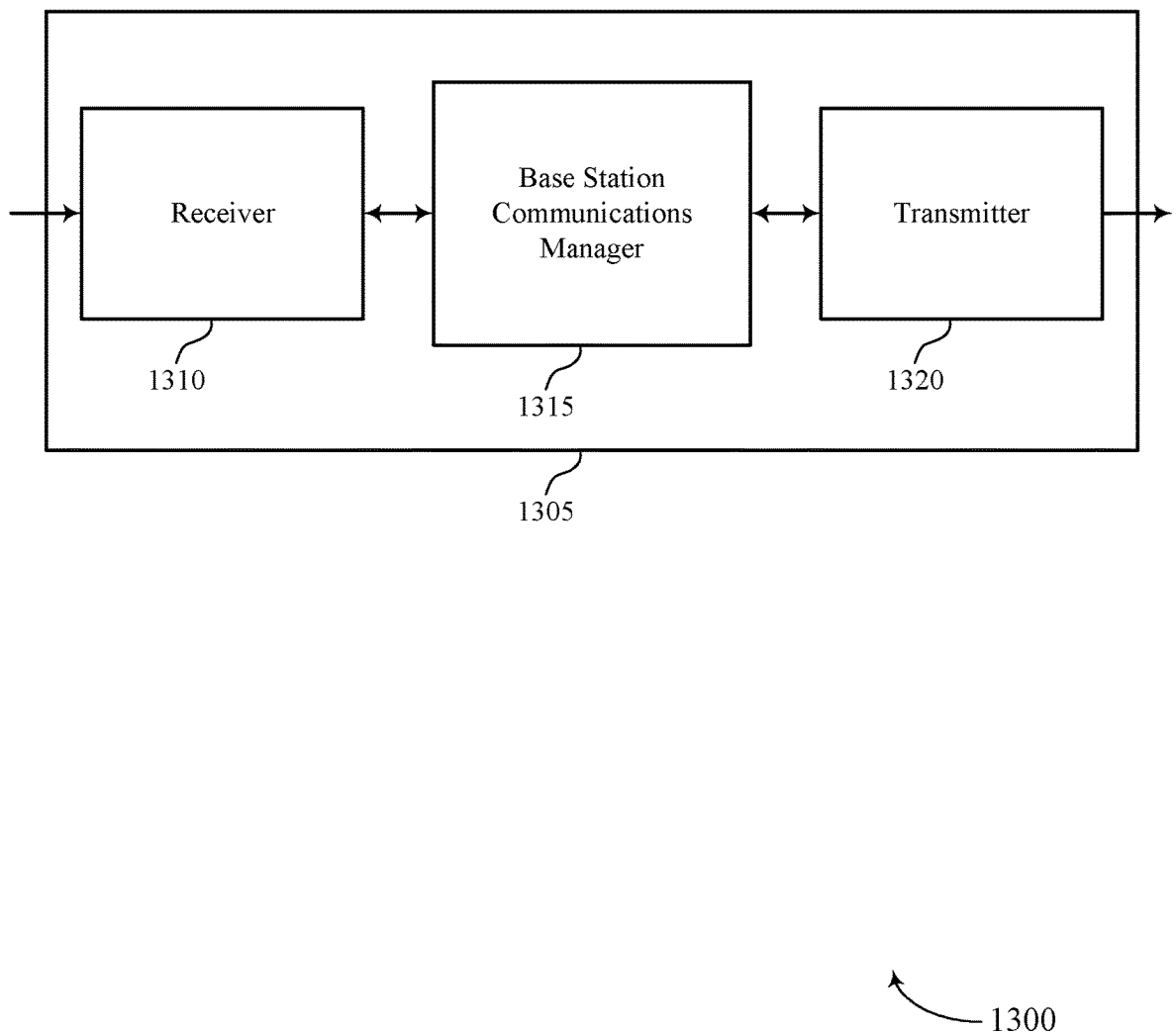
FIGS. 13 through 15 show block diagrams of a device that supports techniques for low-band anchored high-band connections in wireless communications in accordance with aspects of the present disclosure.

FIG. 13 shows a block diagram 1300 of a wireless device 1305 that supports techniques for low-band anchored high-band connections in wireless communications in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for low-band anchored high-band connections in wireless communications, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may establish a low-band connection with a user equipment, transmit configuration information for one or more high-band connections to the UE via the low-band connection, transmit an activation command to the UE to activate one of the one or more high-band connections, and receive an indication of a currently supported mode of the UE for the one or more high-band connections responsive to transmitting the activation command. In some cases, the one or more high-band connections may use mmW frequencies, and the low-band connection may use lower frequencies than the mmW frequencies.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
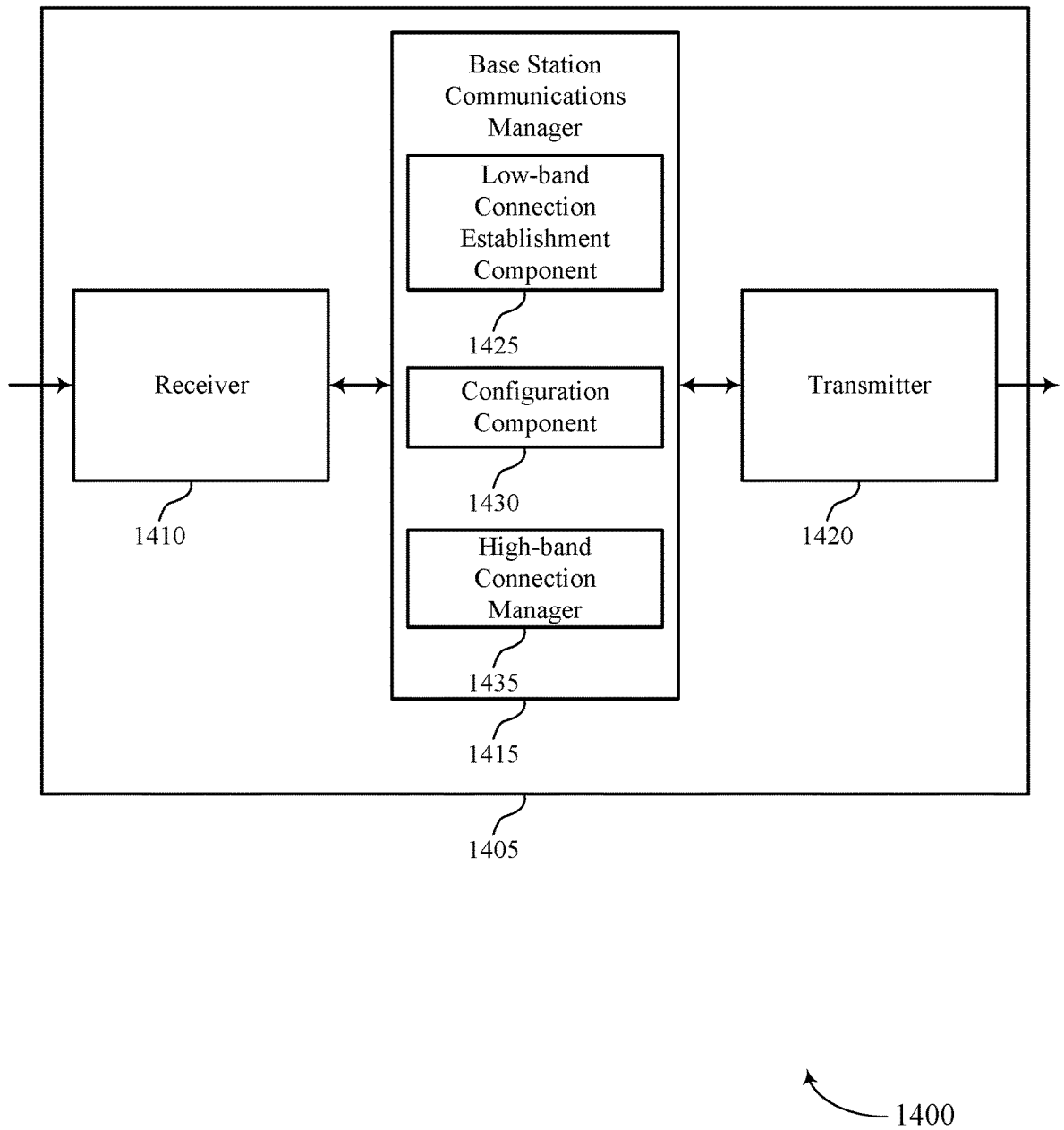

FIG. 14 shows a block diagram 1400 of a wireless device 1405 that supports techniques for low-band anchored high-band connections in wireless communications in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for low-band anchored high-band connections in wireless communications, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may also include low-band connection establishment component 1425, configuration component 1430, and high-band connection manager 1435.

Low-band connection establishment component 1425 may establish a low-band connection with a user equipment. Configuration component 1430 may transmit configuration information for one or more high-band connections to the UE via the low-band connection. In some cases, the one or more high-band connections use millimeter wave (mmW) frequencies, and the low-band connection uses lower frequencies than the mmW frequencies.

High-band connection manager 1435 may transmit an activation command to the UE to activate one of the one or more high-band connections. In some cases, high-band connection manager 1435 may receive an indication of a currently supported mode of the UE for the one or more high-band connections responsive to transmitting the activation command. In some cases, high-band connection manager 1435 may determine that the high-band connection is to be deactivated, and transmit a deactivation command to the UE to deactivate the high-band connection. In some cases, the transmitting the activation command includes transmitting an indication that a high-band connection is to be activated.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
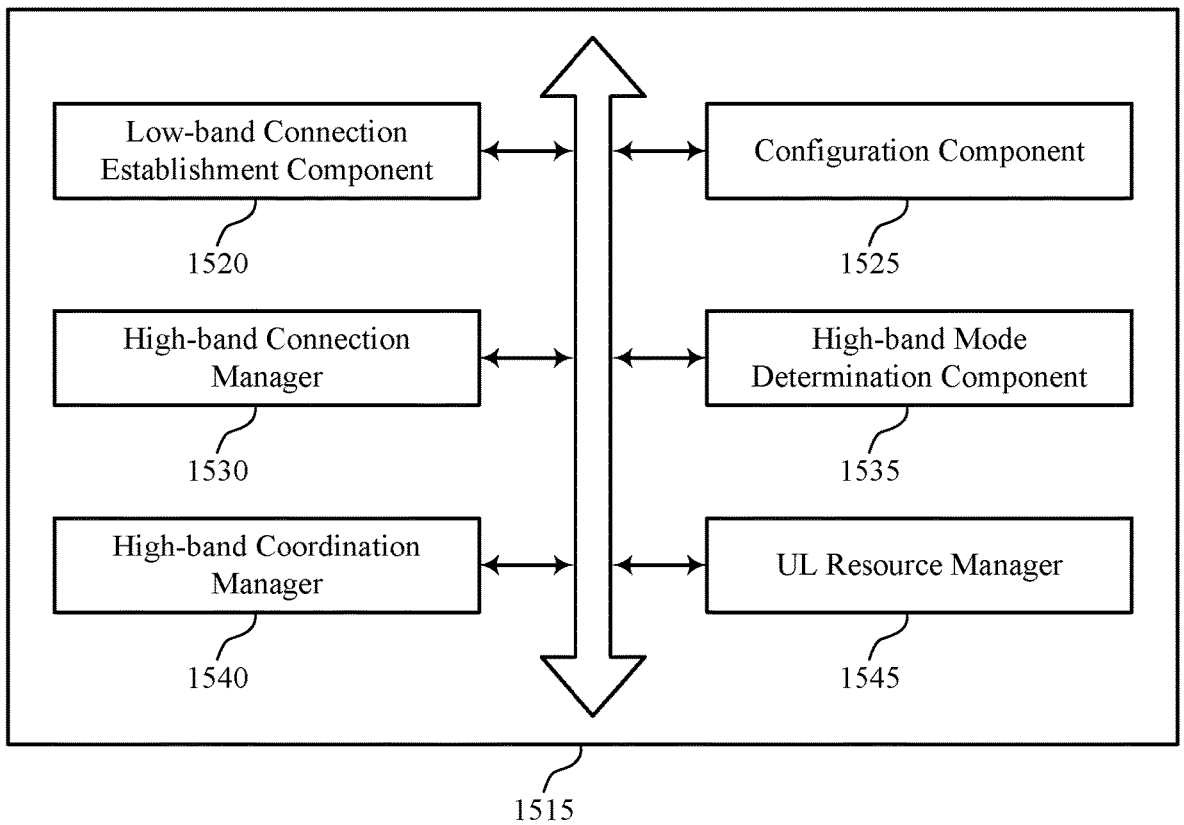

FIG. 15 shows a block diagram 1500 of a base station communications manager 1515 that supports techniques for low-band anchored high-band connections in wireless communications in accordance with aspects of the present disclosure. The base station communications manager 1515 may be an example of aspects of a base station communications manager 1615 described with reference to FIGS. 13, 14, and 16. The base station communications manager 1515 may include low-band connection establishment component 1520, configuration component 1525, high-band connection manager 1530, high-band mode determination component 1535, high-band coordination manager 1540, and UL resource manager 1545. Each of these modules may communicate, directly or indirectly, with one another (e.g., via one or more buses).

Low-band connection establishment component 1520 may establish a low-band connection with a user equipment. Configuration component 1525 may transmit configuration information for one or more high-band connections to the UE via the low-band connection. In some cases, the one or more high-band connections use millimeter wave (mmW) frequencies, and the low-band connection uses lower frequencies than the mmW frequencies.

High-band connection manager 1530 may transmit an activation command to the UE to activate one of the one or more high-band connections. In some cases, high-band connection manager 1530 may receive an indication of a currently supported mode of the UE for the one or more high-band connections responsive to transmitting the activation command. In some cases, high-band connection manager 1530 may determine that the high-band connection is to be deactivated, and transmit a deactivation command to the UE to deactivate the high-band connection. In some cases, the transmitting the activation command includes transmitting an indication that a high-band connection is to be activated.

High-band mode determination component 1535 may receive an indication from the UE that indicates a currently supported mode for the one or more high-band connections, or a change in the currently supported mode. In some cases, the currently supported mode for the one or more high-band connections is based on a power link budget for high-band transmissions, a maximum permissible exposure (MPE) threshold for high-band transmissions, a UE battery state, a UE context and currently running applications, or any combination thereof. In some cases, the currently supported mode for the one or more high-band connections is selected from a high-band connection not found mode, a high-band downlink only mode, a high-band downlink only with uplink control mode, or a high-band downlink and uplink mode.

High-band coordination manager 1540 may coordinate with one or more high-band transmitters to transmit one or more reference signals associated with the one or more high-band connections. In some cases, the one or more reference signals include one or more of a UE specific reference signal, a discovery reference signal (DRS), a channel state information reference signal (CSI-RS), or any combination thereof. In some cases, the one or more reference signals are transmitted responsive to the activation command, are broadcast reference signals, or any combination thereof.

UL resource manager 1545 may configure uplink resources for UE indication of high-band states. In some cases, the configuration information includes uplink resources of the low-band connection or the one or more high-band connections for transmitting the indication. In some cases, the uplink resources include one or more of random access resources, contention free random access resources, partitioned random access resources with partitions based on an identification of the currently supported mode, uplink control channel resources, autonomous uplink resources, or any combination thereof.

Figure 16:
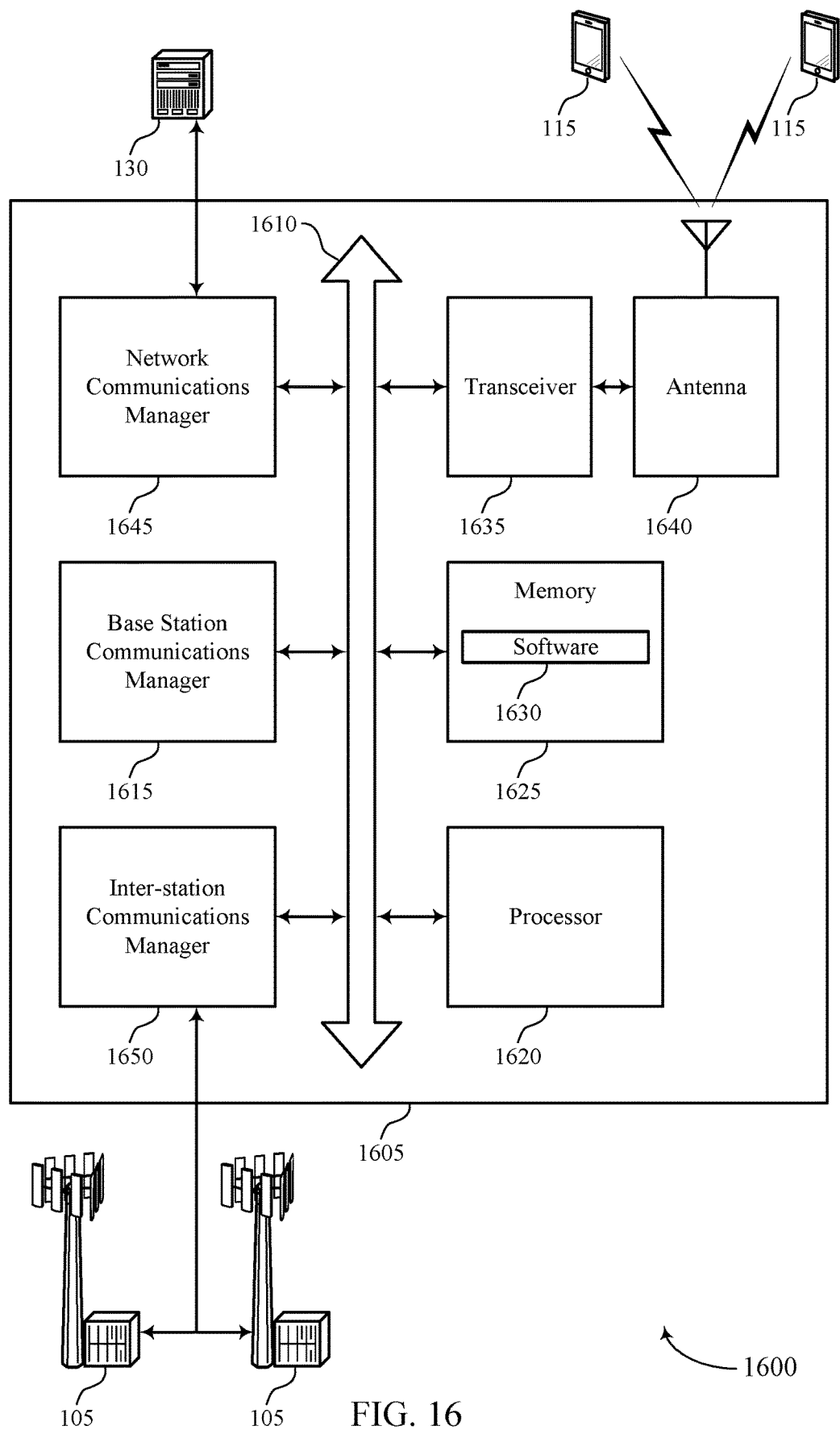
FIG. 16 illustrates a block diagram of a system including a base station that supports techniques for low-band anchored high-band connections in wireless communications in accordance with aspects of the present disclosure.

FIG. 16 shows a diagram of a system 1600 including a device 1605 that supports techniques for low-band anchored high-band connections in wireless communications in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques for low-band anchored high-band connections in wireless communications).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support techniques for low-band anchored high-band connections in wireless communications. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
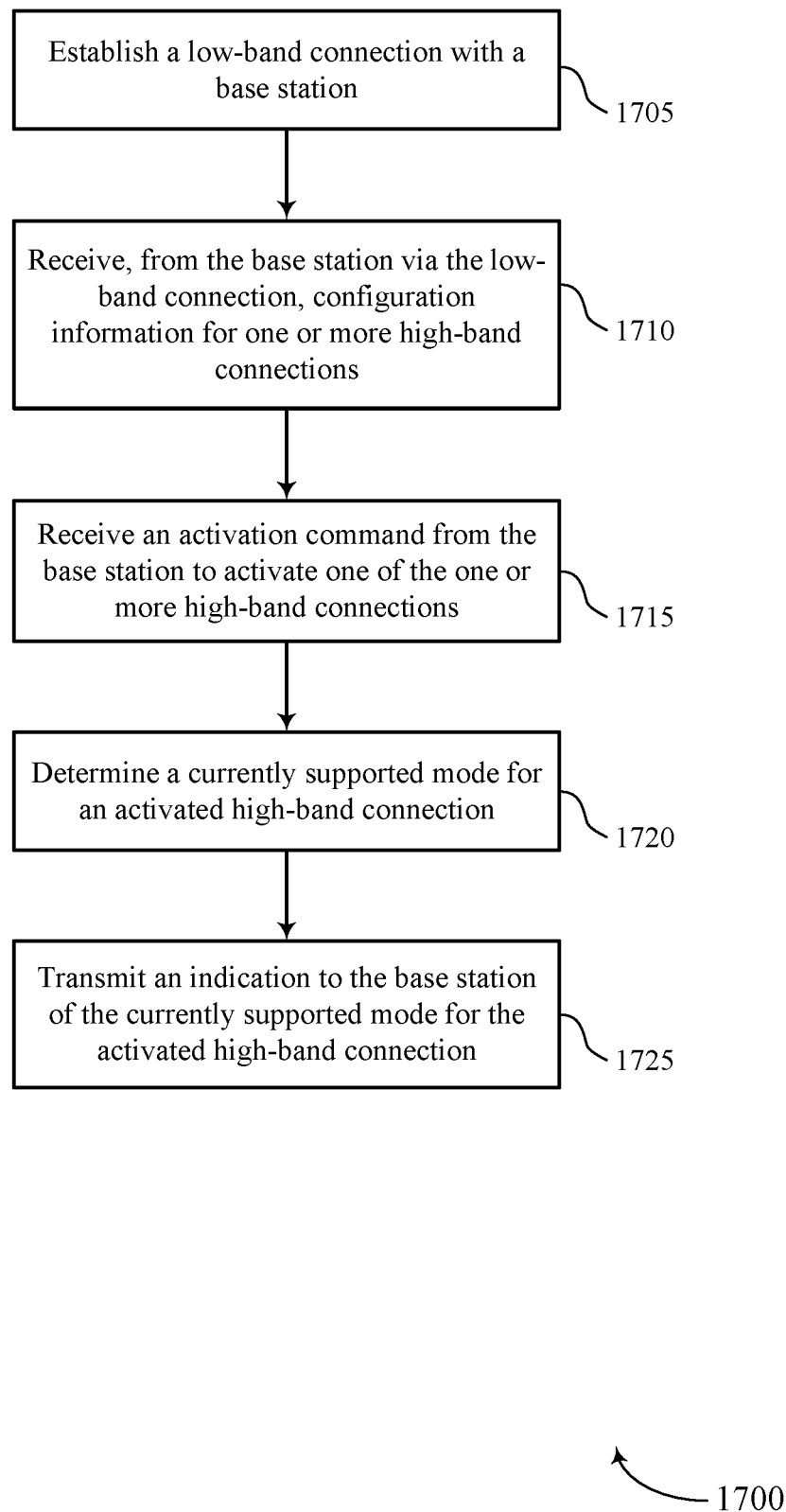
FIGS. 17 through 21 illustrate methods for low-band anchored high-band connections in wireless communications in accordance with aspects of the present disclosure.

FIG. 17 shows a flowchart illustrating a method 1700 for techniques for low-band anchored high-band connections in wireless communications in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may establish a low-band connection with a base station. The operations of 1705 may be performed according to the methods described herein. In certain examples, aspects of the operations of 1705 may be performed by a low-band connection establishment component as described with reference to FIGS. 9 through 12.

At 1710 the UE 115 may receive, from the base station via the low-band connection, configuration information for one or more high-band connections. The operations of 1710 may be performed according to the methods described herein. In certain examples, aspects of the operations of 1710 may be performed by a configuration component as described with reference to FIGS. 9 through 12.

At 1715 the UE 115 may receive an activation command from the base station to activate one of the one or more high-band connections. The operations of 1715 may be performed according to the methods described herein. In certain examples, aspects of the operations of 1715 may be performed by a high-band connection manager as described with reference to FIGS. 9 through 12.

At 1720 the UE 115 may determine a currently supported mode for an activated high-band connection. The operations of 1720 may be performed according to the methods described herein. In certain examples, aspects of the operations of 1720 may be performed by a high-band mode determination component as described with reference to FIGS. 9 through 12.

At 1725 the UE 115 may transmit an indication to the base station of the currently supported mode for the activated high-band connection. The operations of 1725 may be performed according to the methods described herein. In certain examples, aspects of the operations of 1725 may be performed by a high-band connection manager as described with reference to FIGS. 9 through 12.

Figure 18:
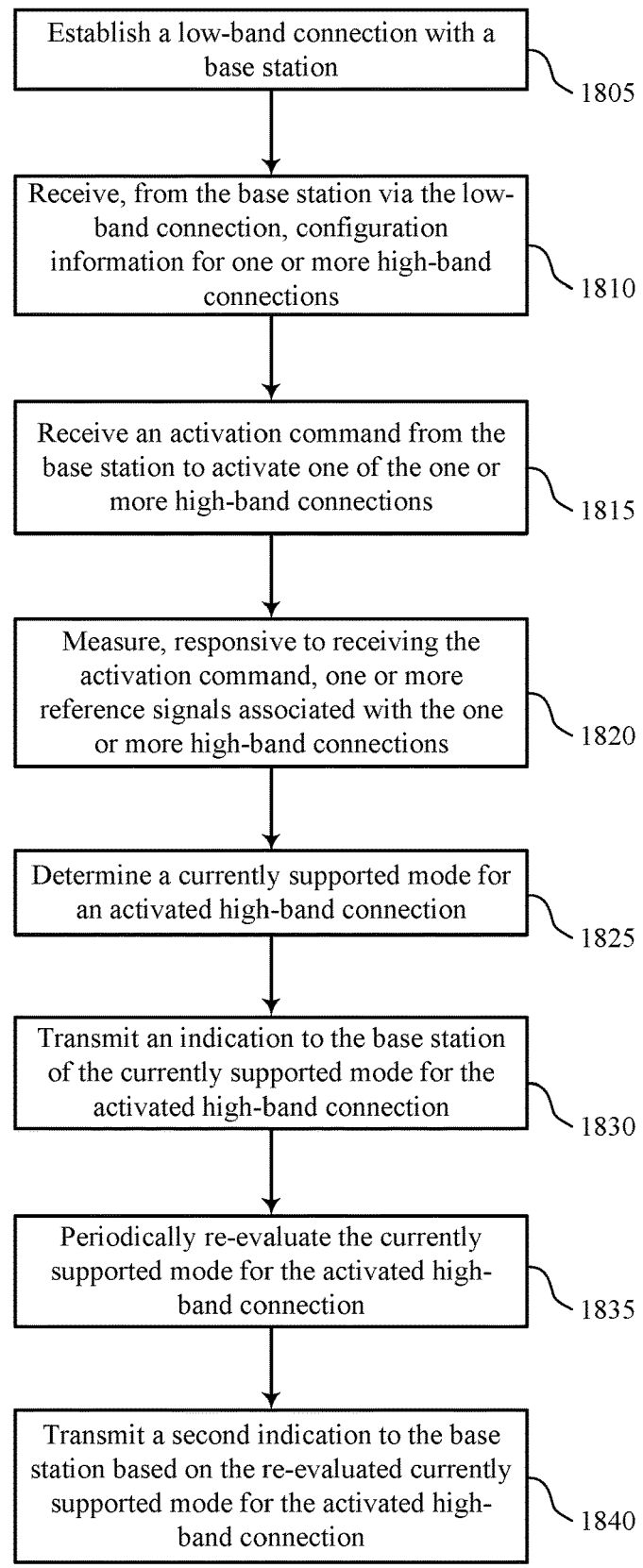

FIG. 18 shows a flowchart illustrating a method 1800 for techniques for low-band anchored high-band connections in wireless communications in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may establish a low-band connection with a base station. The operations of 1805 may be performed according to the methods described herein. In certain examples, aspects of the operations of 1805 may be performed by a low-band connection establishment component as described with reference to FIGS. 9 through 12.

At 1810 the UE 115 may receive, from the base station via the low-band connection, configuration information for one or more high-band connections. In some cases, the one or more high-band connections use millimeter wave (mmW) frequencies, and the low-band connection use lower frequencies than the mmW frequencies. The operations of 1810 may be performed according to the methods described herein. In certain examples, aspects of the operations of 1810 may be performed by a configuration component as described with reference to FIGS. 9 through 12.

At 1815 the UE 115 may receive an activation command from the base station to activate one of the one or more high-band connections. The operations of 1815 may be performed according to the methods described herein. In certain examples, aspects of the operations of 1815 may be performed by a high-band connection manager as described with reference to FIGS. 9 through 12.

At 1820 the UE 115 may measure, responsive to receiving the activation command, one or more reference signals associated with the one or more high-band connections. The operations of 1820 may be performed according to the methods described herein. In certain examples, aspects of the operations of 1820 may be performed by a measurement component as described with reference to FIGS. 9 through 12. The one or more reference signals may include one or more of a UE-RS, a DRS, a CSI-RS, or any combination thereof.

At 1825 the UE 115 may determine a currently supported mode for an activated high-band connection. The operations of 1825 may be performed according to the methods described herein. In certain examples, aspects of the operations of 1825 may be performed by a high-band mode determination component as described with reference to FIGS. 9 through 12.

At 1830 the UE 115 may transmit an indication to the base station of the currently supported mode for the activated high-band connection. The operations of 1830 may be performed according to the methods described herein. In certain examples, aspects of the operations of 1830 may be performed by a high-band connection manager as described with reference to FIGS. 9 through 12.

At 1835 the UE 115 may periodically re-evaluate the currently supported mode for the activated high-band connection. The operations of 1835 may be performed according to the methods described herein. In certain examples, aspects of the operations of 1835 may be performed by a high-band mode determination component as described with reference to FIGS. 9 through 12.

At 1840 the UE 115 may transmit a second indication to the base station based at least in part on the re-evaluated currently supported mode for the activated high-band connection. In some cases, the second indication may be transmitted periodically or upon a change in the currently supported mode for the activated high-band connection. The operations of 1840 may be performed according to the methods described herein. In certain examples, aspects of the operations of 1840 may be performed by a high-band connection manager as described with reference to FIGS. 9 through 12.

Figure 19:
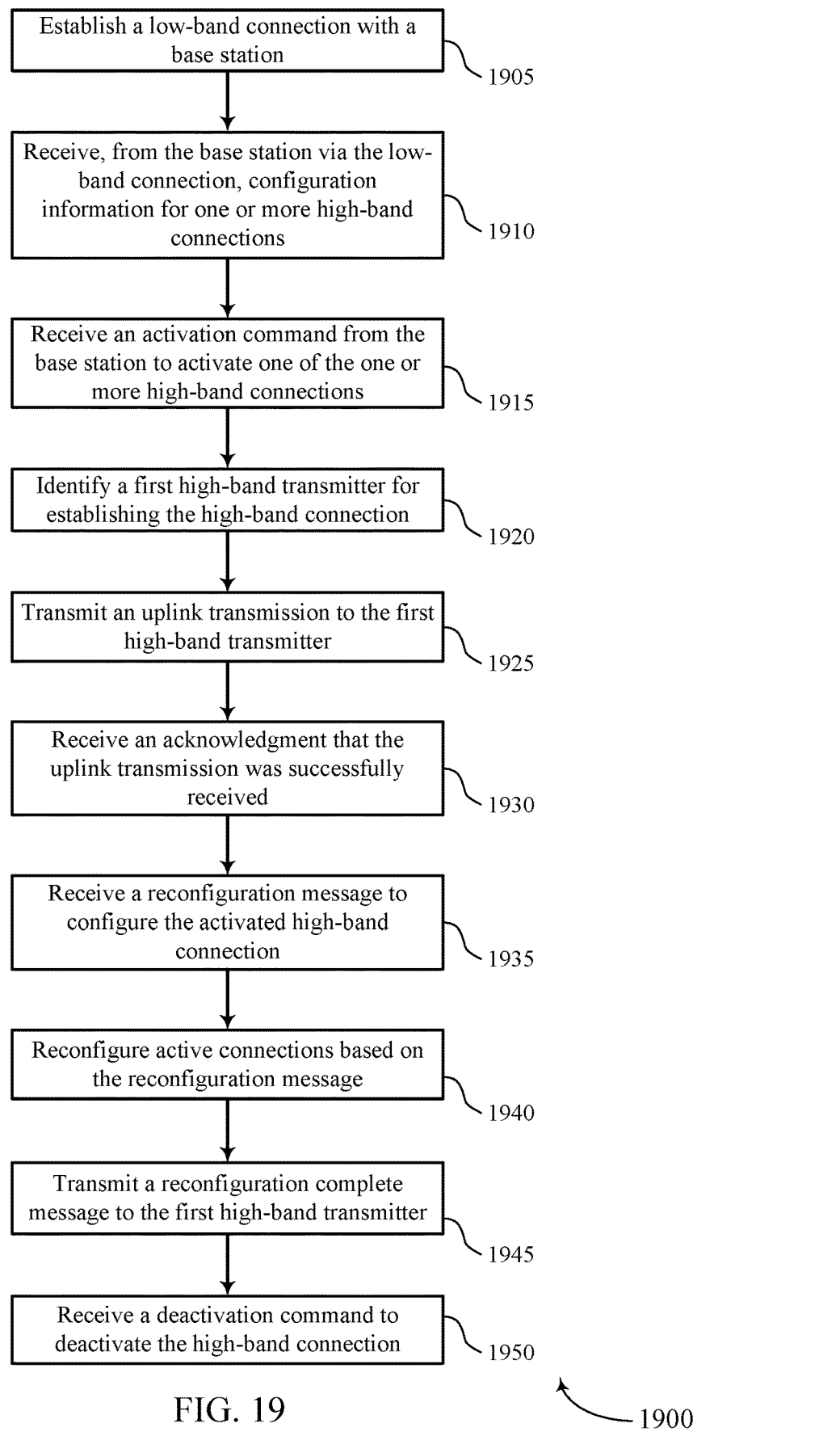

FIG. 19 shows a flowchart illustrating a method 1900 for techniques for low-band anchored high-band connections in wireless communications in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may establish a low-band connection with a base station. The operations of 1905 may be performed according to the methods described herein. In certain examples, aspects of the operations of 1905 may be performed by a low-band connection establishment component as described with reference to FIGS. 9 through 12.

At 1910 the UE 115 may receive, from the base station via the low-band connection, configuration information for one or more high-band connections. The operations of 1910 may be performed according to the methods described herein. In certain examples, aspects of the operations of 1910 may be performed by a configuration component as described with reference to FIGS. 9 through 12.

At 1915 the UE 115 may receive an activation command from the base station to activate one of the one or more high-band connections. The operations of 1915 may be performed according to the methods described herein. In certain examples, aspects of the operations of 1915 may be performed by a high-band connection manager as described with reference to FIGS. 9 through 12.

At 1920 the UE 115 may identify a first high-band transmitter for establishing the high-band connection. The operations of 1920 may be performed according to the methods described herein. In certain examples, aspects of the operations of 1920 may be performed by a high-band connection manager as described with reference to FIGS. 9 through 12.

At 1925 the UE 115 may transmit an uplink transmission (e.g., a random access request) to the first high-band transmitter. The operations of 1925 may be performed according to the methods described herein. In certain examples, aspects of the operations of 1925 may be performed by a high-band connection manager as described with reference to FIGS. 9 through 12.

At 1930 the UE 115 may receive an acknowledgment that the uplink transmission was successfully received. The operations of 1930 may be performed according to the methods described herein. In certain examples, aspects of the operations of 1930 may be performed by a high-band connection manager as described with reference to FIGS. 9 through 12.

At 1935 the UE 115 may receive a reconfiguration message to configure the activated high-band connection. The operations of 1935 may be performed according to the methods described herein. In certain examples, aspects of the operations of 1935 may be performed by a high-band connection manager as described with reference to FIGS. 9 through 12.

At 1940 the UE 115 may reconfigure active connections based at least in part on the reconfiguration message. The operations of 1940 may be performed according to the methods described herein. In certain examples, aspects of the operations of 1940 may be performed by a high-band connection manager as described with reference to FIGS. 9 through 12.

At 1945 the UE 115 may transmit a reconfiguration complete message to the first high-band transmitter. The operations of 1945 may be performed according to the methods described herein. In certain examples, aspects of the operations of 1945 may be performed by a high-band connection manager as described with reference to FIGS. 9 through 12.

At 1950 the UE 115 may receive a deactivation command to deactivate the activated high-band connection. The operations of 1950 may be performed according to the methods described herein. In certain examples, aspects of the operations of 1950 may be performed by a high-band connection manager as described with reference to FIGS. 9 through 12.

Figure 20:
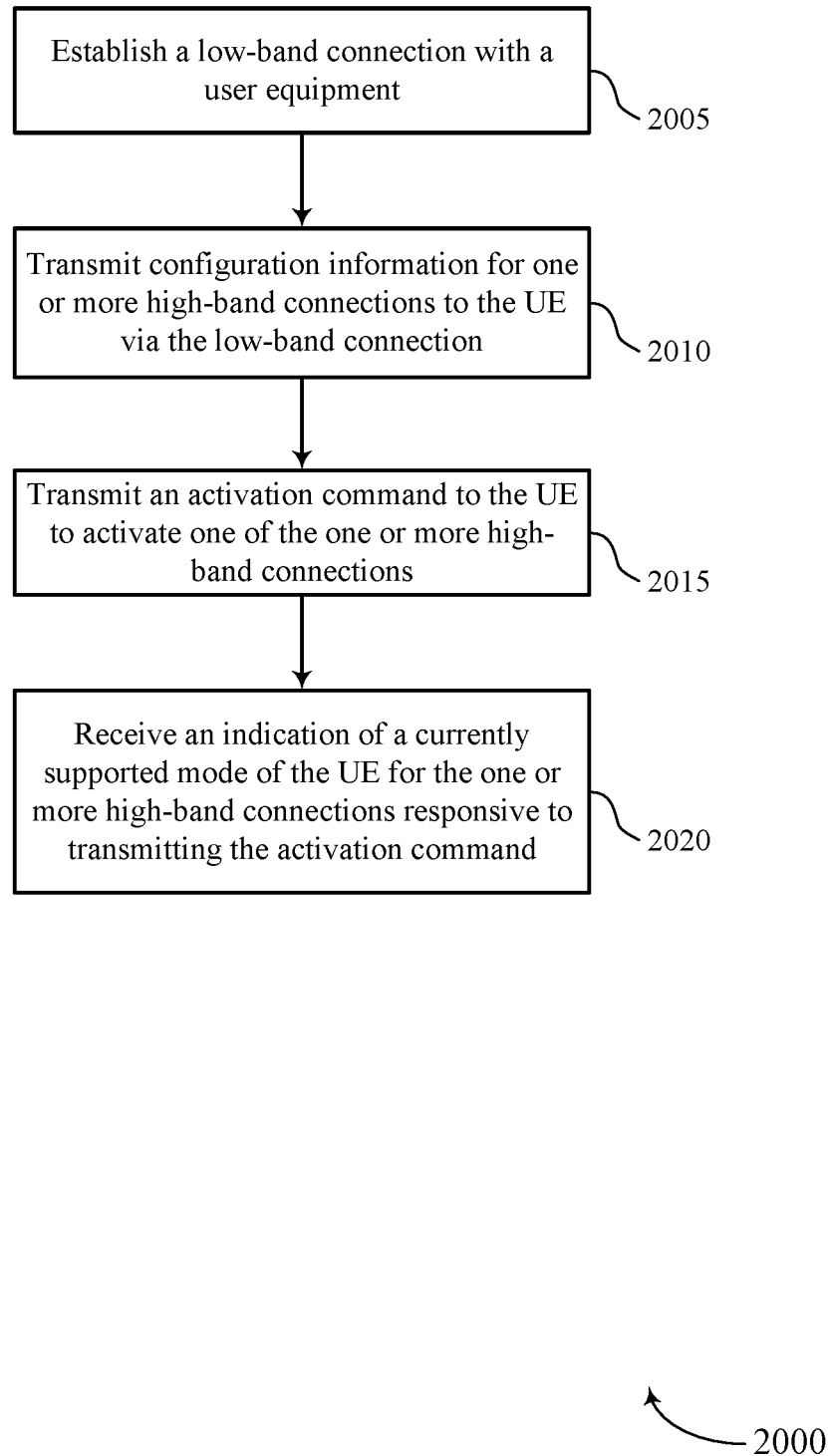

FIG. 20 shows a flowchart illustrating a method 2000 for techniques for low-band anchored high-band connections in wireless communications in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may establish a low-band connection with a user equipment. The operations of 2005 may be performed according to the methods described herein. In certain examples, aspects of the operations of 2005 may be performed by a low-band connection establishment component as described with reference to FIGS. 13 through 16.

At 2010 the base station 105 may transmit configuration information for one or more high-band connections to the UE via the low-band connection. In some cases, the one or more high-band connections use millimeter wave (mmW) frequencies, and the low-band connection use lower frequencies than the mmW frequencies. The operations of 2010 may be performed according to the methods described herein. In certain examples, aspects of the operations of 2010 may be performed by a configuration component as described with reference to FIGS. 13 through 16.

At 2015 the base station 105 may transmit an activation command to the UE to activate one of the one or more high-band connections. The operations of 2015 may be performed according to the methods described herein. In certain examples, aspects of the operations of 2015 may be performed by a high-band connection manager as described with reference to FIGS. 13 through 16.

At 2020 the base station 105 may receive an indication of a currently supported mode of the UE for the one or more high-band connections responsive to transmitting the activation command. The operations of 2020 may be performed according to the methods described herein. In certain examples, aspects of the operations of 2020 may be performed by a high-band connection manager as described with reference to FIGS. 13 through 16.

Figure 21:
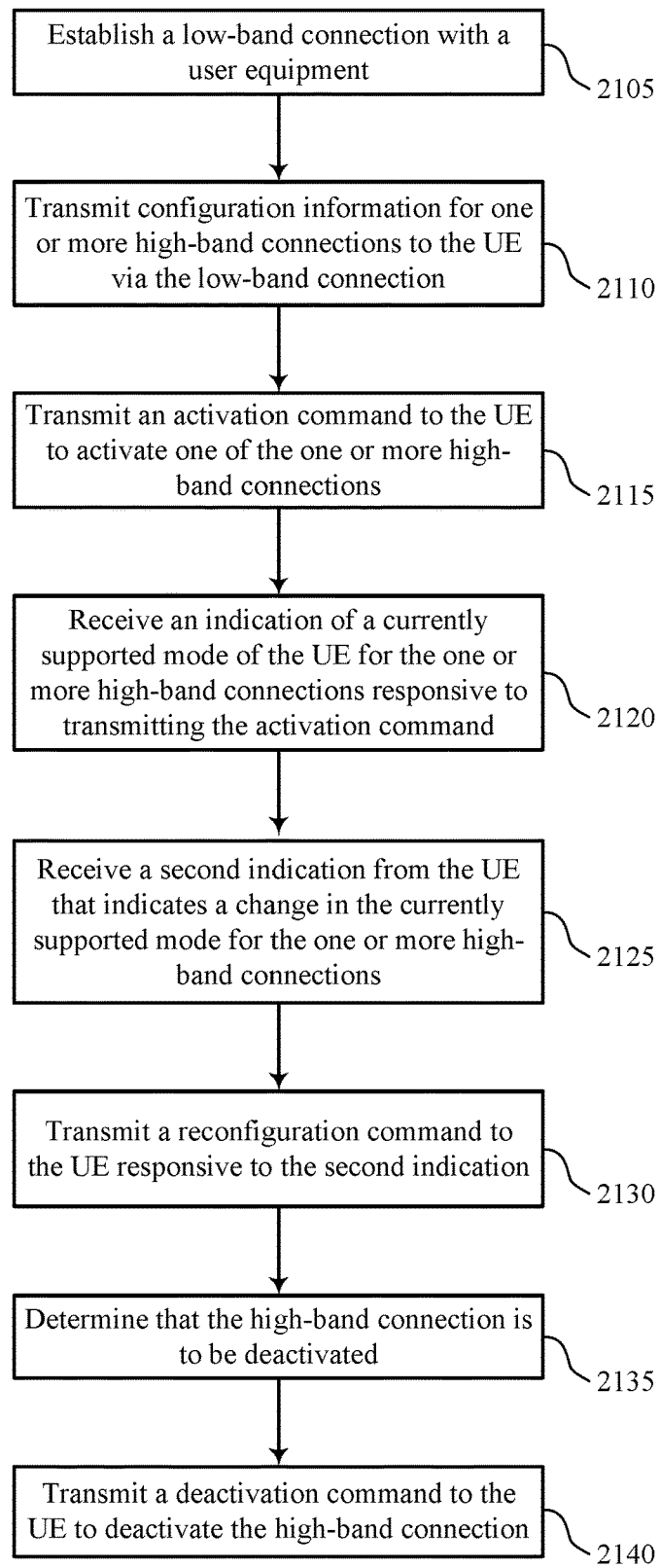

FIG. 21 shows a flowchart illustrating a method 2100 for techniques for low-band anchored high-band connections in wireless communications in accordance with aspects of the present disclosure. The operations of method 2100 may be implemented by a base station 105 or its components as described herein. For example, the operations of method 2100 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may establish a low-band connection with a user equipment. The operations of 2105 may be performed according to the methods described herein. In certain examples, aspects of the operations of 2105 may be performed by a low-band connection establishment component as described with reference to FIGS. 13 through 16.

At 2110 the base station 105 may transmit configuration information for one or more high-band connections to the UE via the low-band connection. The operations of 2110 may be performed according to the methods described herein. In certain examples, aspects of the operations of 2110 may be performed by a configuration component as described with reference to FIGS. 13 through 16.

At 2115 the base station 105 may transmit an activation command to the UE to activate one of the one or more high-band connections. The operations of 2115 may be performed according to the methods described herein. In certain examples, aspects of the operations of 2115 may be performed by a high-band connection manager as described with reference to FIGS. 13 through 16.

At 2120 the base station 105 may receive an indication of a currently supported mode of the UE for the one or more high-band connections responsive to transmitting the activation command. The operations of 2120 may be performed according to the methods described herein. In certain examples, aspects of the operations of 2120 may be performed by a high-band connection manager as described with reference to FIGS. 13 through 16.

At 2125 the base station 105 may receive a second indication from the UE that indicates a change in the currently supported mode for the one or more high-band connections. The operations of 2125 may be performed according to the methods described herein. In certain examples, aspects of the operations of 2125 may be performed by a high-band mode determination component as described with reference to FIGS. 13 through 16.

At 2130 the base station 105 may transmit a reconfiguration command to the UE responsive to the second indication. The operations of 2130 may be performed according to the methods described herein. In certain examples, aspects of the operations of 2130 may be performed by a high-band connection manager as described with reference to FIGS. 13 through 16.

At 2135 the base station 105 may determine that the high-band connection is to be deactivated. The operations of 2135 may be performed according to the methods described herein. In certain examples, aspects of the operations of 2135 may be performed by a high-band connection manager as described with reference to FIGS. 13 through 16.

At 2140 the base station 105 may transmit a deactivation command to the UE to deactivate the high-band connection. The operations of 2140 may be performed according to the methods described herein. In certain examples, aspects of the operations of 2140 may be performed by a high-band connection manager as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing a low-band connection with a base station;
   receiving, from the base station via the low-band connection, configuration information for one or more high-band connections;
   receiving an activation command from the base station to activate one of the one or more high-band connections;
   determining a currently supported mode for an activated high-band connection based at least in part on one or more measurements or parameters associated with the one or more high-band connections; and
   transmitting an indication to the base station of the currently supported mode for the activated high-band connection.

2. The method of claim 1, further comprising:
   measuring, responsive to receiving the activation command, one or more reference signals associated with the one or more high-band connections, and wherein the one or more measurements for determining the currently supported mode for the activated high-band connection comprise one or more measurements of the one or more reference signals.

3. The method of claim 2, wherein the one or more reference signals comprise one or more of a user equipment (UE) specific reference signal, a discovery reference signal (DRS), a channel state information reference signal (CSI-RS), or any combination thereof, and wherein the one or more reference signals are transmitted responsive to the activation command, are broadcast reference signals, or any combination thereof.

4. The method of claim 1, wherein the transmitting the indication comprises:
   identifying uplink resources of the low-band connection or the activated high-band connection for transmitting the indication, the uplink resources comprising one or more of random access resources, contention free random access resources, partitioned random access resources with partitions based on an identification of the currently supported mode, uplink control channel resources, autonomous uplink resources, or any combination thereof; and
   transmitting the indication using the identified uplink resources.

5. The method of claim 1, further comprising:
   periodically re-evaluating the currently supported mode for the activated high-band connection.

6. The method of claim 5, further comprising:
   transmitting a second indication to the base station based at least in part on the re-evaluated currently supported mode for the activated high-band connection, wherein the second indication is transmitted periodically or upon a change in the currently supported mode for the activated high-band connection.

7. The method of claim 1, further comprising:
   measuring one or more channel parameters for the one or more high-band connections; and
   identifying one or more user equipment (UE) parameters associated with transmissions for the activated high-band connection, and wherein the one or more parameters for determining the currently supported mode for the activated high-band connection comprise the one or more channel parameters, the one or more UE parameters, or any combination thereof.

8. The method of claim 7, wherein the one or more UE parameters comprise one or more of:
   a power link budget for high-band transmissions,
   a maximum permissible exposure (MPE) threshold for high-band transmissions,
   a UE battery state,
   a UE context and currently running applications,
   or any combination thereof.

9. The method of claim 7, wherein the one or more channel parameters comprise one or more of a reference signal received power (RSRP) of one or more high-band transmissions, a beam direction of one or more high-band transmissions, a channel quality measurement of one or more high-band transmissions, or any combination thereof.

10. The method of claim 1, wherein the method is performed by a user equipment (UE), and wherein the UE transitions to a radio resource control (RRC) high-band activated state or to a high-band activated device state responsive to receiving the activation command.

11. The method of claim 1, further comprising:
    determining that the currently supported mode for the activated high-band connection has changed; and
    transmitting a second indication to the base station to indicate the currently supported mode for the activated high-band connection has changed.

12. The method of claim 1, wherein the currently supported mode for the activated high-band connection is selected from a high-band connection not found mode, a high-band downlink only mode, a high-band downlink only with uplink control mode, or a high-band downlink and uplink mode.

13. The method of claim 1, wherein the receiving the activation command from the base station comprises receiving an indication that a high-band connection is to be activated, and wherein the method further comprises:
monitoring for a high-band transmission from one or more base stations based at least in part on the configuration information for the one or more high-band connections;
identifying a first high-band transmitter for establishing the high-band connection;
transmitting an uplink transmission to the first high-band transmitter; and
receiving an acknowledgment that the uplink transmission was successfully received.

14. The method of claim 13, further comprising:
receiving a reconfiguration message to configure the activated high-band connection;
reconfiguring active connections based at least in part on the reconfiguration message; and
transmitting a reconfiguration complete message to the first high-band transmitter.

15. The method of claim 13, further comprising:
receiving a deactivation command to deactivate the activated high-band connection; and
deactivating the activated high-band connection responsive to the deactivation command.

16. A method for wireless communication, comprising:
establishing a low-band connection with a user equipment (UE);
transmitting configuration information for one or more high-band connections to the UE via the low-band connection;
transmitting an activation command to the UE to activate one of the one or more high-band connections; and
receiving an indication of a currently supported mode of the UE for the one or more high-band connections responsive to transmitting the activation command.

17. The method of claim 16, wherein the currently supported mode for the one or more high-band connections is based at least in part on a power link budget for high-band transmissions, a maximum permissible exposure (MPE) threshold for high-band transmissions, a UE battery state, a UE context and currently running applications, or any combination thereof.

18. The method of claim 16, further comprising:
receiving a second indication from the UE that indicates a change in the currently supported mode for the one or more high-band connections, and wherein the method further comprises; and
transmitting a reconfiguration command to the UE responsive to the second indication.

19. The method of claim 16, wherein the currently supported mode for the one or more high-band connections corresponds to a high-band connection not found mode, a high-band downlink only mode, a high-band downlink only with uplink control mode, or a high-band downlink and uplink mode.

20. The method of claim 16, wherein the transmitting the activation command comprises transmitting an indication that a high-band connection is to be activated, and wherein the method further comprises:
receiving an indication that the high-band connection has been activated.

21. The method of claim 20, further comprising:
determining that the high-band connection is to be deactivated; and
transmitting a deactivation command to the UE to deactivate the high-band connection.

22. The method of claim 16, further comprising:
coordinating with one or more high-band transmitters to transmit one or more reference signals associated with the one or more high-band connections.

23. The method of claim 22, wherein the one or more reference signals comprise one or more of a user equipment (UE) specific reference signal, a discovery reference signal (DRS), a channel state information reference signal (CSI-RS), or any combination thereof, and wherein the one or more reference signals are transmitted responsive to the activation command, are broadcast reference signals, or any combination thereof.

24. The method of claim 16, wherein the configuration information further comprises uplink resources of the low-band connection or the one or more high-band connections for transmitting the indication, the uplink resources comprising one or more of random access resources, contention free random access resources, partitioned random access resources with partitions based on an identification of the currently supported mode, uplink control channel resources, autonomous uplink resources, or any combination thereof.

25. An apparatus for wireless communication, comprising:
a processor;
memory in electronic communication with the processor; and
instructions stored in the memory and executable by the processor to cause the apparatus to:
establish a low-band connection with a base station;
receive, from the base station via the low-band connection, configuration information for one or more high-band connections;
receive an activation command from the base station to activate one of the one or more high-band connections;
determine a currently supported mode for an activated high-band connection based at least in part on one or more measurements or parameters associated with the one or more high-band connections; and
transmit an indication to the base station of the currently supported mode for the activated high-band connection.

26. The apparatus of claim 25, wherein the instructions are further executable by the processor to cause the apparatus to:
measure, responsive to receiving the activation command, one or more reference signals associated with the one or more high-band connections, and wherein the one or more measurements for determining the currently supported mode for the activated high-band connection comprise one or more measurements of the one or more reference signals.

27. The apparatus of claim 25, wherein the instructions are further executable by the processor to cause the apparatus to:
periodically re-evaluate the currently supported mode for the activated high-band connection.

28. An apparatus for wireless communication, comprising:
a processor;
memory in electronic communication with the processor; and
instructions stored in the memory and executable by the processor to cause the apparatus to:
establish a low-band connection with a user equipment (UE);

transmit configuration information for one or more high-band connections to the UE via the low-band connection;

transmit an activation command to the UE to activate one of the one or more high-band connections; and receive an indication of a currently supported mode of the UE for the one or more high-band connections responsive to transmitting the activation command.

29. The apparatus of claim 28, wherein the currently supported mode for the one or more high-band connections is based at least in part on a power link budget for high-band transmissions, a maximum permissible exposure (MPE) threshold for high-band transmissions, a UE battery state, a UE context and currently running applications, or any combination thereof.

30. The apparatus of claim 28, wherein the instructions are further executable by the processor to cause the apparatus to:

receive a second indication from the UE that indicates a change in the currently supported mode for the one or more high-band connections, and wherein the method further comprises; and transmit a reconfiguration command to the UE responsive to the second indication.

* * * * *